United States Patent
Toussaint, Jr. et al.

(10) Patent No.: US 8,909,127 B2
(45) Date of Patent: Dec. 9, 2014

(54) COMPUTER-IMPLEMENTED SYSTEMS AND METHODS FOR CARRYING OUT NON-CENTRALIZED ASSESSMENTS

(71) Applicants: Wilson Gerald Toussaint, Jr., Southampton, PA (US); Kenneth H. Berger, Princeton, NJ (US); Diana Wright Cano, Princeton, NJ (US); Debra Pisacreta, Lambertville, NJ (US); Brent Bridgeman, Pennington, NJ (US)

(72) Inventors: Wilson Gerald Toussaint, Jr., Southampton, PA (US); Kenneth H. Berger, Princeton, NJ (US); Diana Wright Cano, Princeton, NJ (US); Debra Pisacreta, Lambertville, NJ (US); Brent Bridgeman, Pennington, NJ (US)

(73) Assignee: Educational Testing Service, Princeton, NJ (US)

(*) Notice: Subject to any disclaimer, the term of this patent is extended or adjusted under 35 U.S.C. 154(b) by 0 days.

(21) Appl. No.: 13/627,430

(22) Filed: Sep. 26, 2012

(65) Prior Publication Data
US 2013/0078605 A1      Mar. 28, 2013

Related U.S. Application Data

(60) Provisional application No. 61/539,777, filed on Sep. 27, 2011.

(51) Int. Cl.
G09B 7/00       (2006.01)
G09B 7/02       (2006.01)
(52) U.S. Cl.
CPC ..................................... *G09B 7/02* (2013.01)
USPC ........................................................ 434/362

(58) Field of Classification Search
USPC .......................................................... 434/362
See application file for complete search history.

(56) References Cited

U.S. PATENT DOCUMENTS

| | | | |
|---|---|---|---|
| 5,565,316 | A | 10/1996 | Kershaw et al. |
| 5,827,070 | A * | 10/1998 | Kershaw et al. ............... 434/322 |
| 5,890,911 | A | 4/1999 | Griswold et al. |
| 5,915,973 | A | 6/1999 | Hoehn-Saric et al. |
| 5,947,747 | A | 9/1999 | Walker et al. |
| 6,000,945 | A | 12/1999 | Sanchez-Lazer et al. |
| 6,014,760 | A | 1/2000 | Silva et al. |
| 6,112,049 | A | 8/2000 | Sonnenfeld |
| 6,112,051 | A | 8/2000 | De Almeda |
| 6,208,832 | B1 | 3/2001 | Remschel |

(Continued)

OTHER PUBLICATIONS

On Tour Media Press Release; On Tour IntraLearn Delivers First Internet-based Training and Testing Solution for Online Certification; 1998.

(Continued)

*Primary Examiner* — Robert J Utama
*Assistant Examiner* — Sadaruz Zaman
(74) *Attorney, Agent, or Firm* — Jones Day

(57) ABSTRACT

Systems and methods are provided for carrying out an examination with a client computer. A client computer is booted using a secondary operating system other than a primary operating system of the client computer that is accessed from a computer readable medium provided by an administrator of an examination only on the day of the examination. A broadcast message is sent from the client computer to check for the existence of a local server and to establish communication with the local server. A client application is received from the local server for presenting the examination at the client computer. Assessment content is received for the examination from the local server. The examination including the assessment content is presented to a user of the client computer with the client application, and user responses are received at the client computer and transmitted to the local server.

28 Claims, 20 Drawing Sheets

(56) References Cited

U.S. PATENT DOCUMENTS

| | | | |
|---|---|---|---|
| 6,212,564 | B1 | 4/2001 | Harter et al. |
| 6,282,404 | B1 | 8/2001 | Linton |
| 6,301,571 | B1 | 10/2001 | Tatsuoka |
| 6,315,572 | B1 | 11/2001 | Owens et al. |
| 6,370,355 | B1 | 4/2002 | Ceretta et al. |
| 6,381,444 | B1 | 4/2002 | Aggarwal et al. |
| 6,413,100 | B1 | 7/2002 | Dickmeyer et al. |
| 6,431,875 | B1 | 8/2002 | Elliott |
| 6,442,370 | B1 | 8/2002 | Driscoll et al. |
| 6,513,042 | B1 | 1/2003 | Anderson et al. |
| 7,099,620 | B2 | 8/2006 | Miller |
| 7,536,598 | B2 * | 5/2009 | Largman et al. ............... 714/36 |
| 2001/0031457 | A1 | 10/2001 | Pfenninger et al. |
| 2002/0045155 | A1 | 4/2002 | Sugimoto |
| 2002/0119433 | A1 | 8/2002 | Callender |
| 2003/0203342 | A1 | 10/2003 | Bowers |
| 2004/0106088 | A1 * | 6/2004 | Driscoll et al. ............... 434/118 |
| 2004/0229199 | A1 | 11/2004 | Ashley et al. |
| 2007/0020603 | A1 * | 1/2007 | Woulfe ........................ 434/350 |
| 2007/0271205 | A1 * | 11/2007 | Aravamudan et al. .......... 706/12 |
| 2009/0170058 | A1 * | 7/2009 | Walker et al. ................. 434/323 |

OTHER PUBLICATIONS

On Tour Media Inc.; IntraLearn Web-based Certification Training and Management System, Administrator Guide; 1998.

On Tour Media Inc.; IntraLearn Web-based Certification Training and Management System, Student Manual; 1998.

* cited by examiner

COMPUTER-IMPLEMENTED SYSTEMS AND METHODS FOR CARRYING OUT NON-CENTRALIZED ASSESSMENTS

CROSS-REFERENCE TO RELATED APPLICATIONS

This application claims the benefit of U.S. Provisional Patent Application No. 61/539,777 filed on Sep. 27, 2011, the entire contents of which are incorporated herein by reference.

TECHNICAL FIELD

This document relates generally to assessment administration and more particularly to non-centralized computerized assessment administration.

BACKGROUND

For many years, standardized tests (assessments) have been administered to examinees for various reasons, such as for educational testing or for evaluating particular skills. For example, academic skills tests (e.g., SATs, GREs, LSATs, GMATs, etc.) are typically administered to a large number of students. Results of these tests are used by colleges, universities, and other educational institutions as a factor in determining whether an examinee should be admitted to study at that educational institution. Other standardized testing is carried out to determine whether or not an individual has attained a specified level of knowledge or mastery of a given subject.

Traditionally, standardized tests have been paper-based, whereby examinees are gathered in a room and given paper test materials, usually comprising a question booklet and an answer sheet that is computer readable by optical or magnetic means. With the growth of the computer industry and the reduction in price of computing equipment, fields in which information has traditionally been distributed on paper have begun to convert to electronic information distribution. The field of standardized testing is no exception. A modestly-priced computer system can be used in place of a paper test booklet to administer test questions to a user. The use of computer systems to deliver test questions to users is generically described as "computer based testing" (CBT). Some computer-based testing has been carried out with test takers using their own computing equipment such as laptop computers. The present inventors have observed that such conventional systems may suffer from lack of reliability, lack of control, and lack of security, and have identified a need to overcome these and other shortcomings.

SUMMARY

In accordance with the teachings herein, systems and methods are provided for carrying out or administering an examination. According to one example, a client computer is booted using a secondary operating system that is accessed from a computer readable medium that is external to the client computer. A broadcast message is sent from the client computer to check for the existence of a local server and to establish a connection to the local server. A client application is received from the local server. Assessment content is received from the local server. The received client application is used to present the assessment content to the user, and user responses are received and transmitted to the local server.

As another example, a broadcast message is received from a client computer at a local server and communication is established with the client computer. A client application is transmitted to the client computer. Assessment content is transmitted to the client computer for the examination, and user responses are received from the client computer relating to the assessment content, where the responses are transferred to the server computer without being stored in non-volatile storage on the client computer.

DETAILED DESCRIPTION

Figure 1:
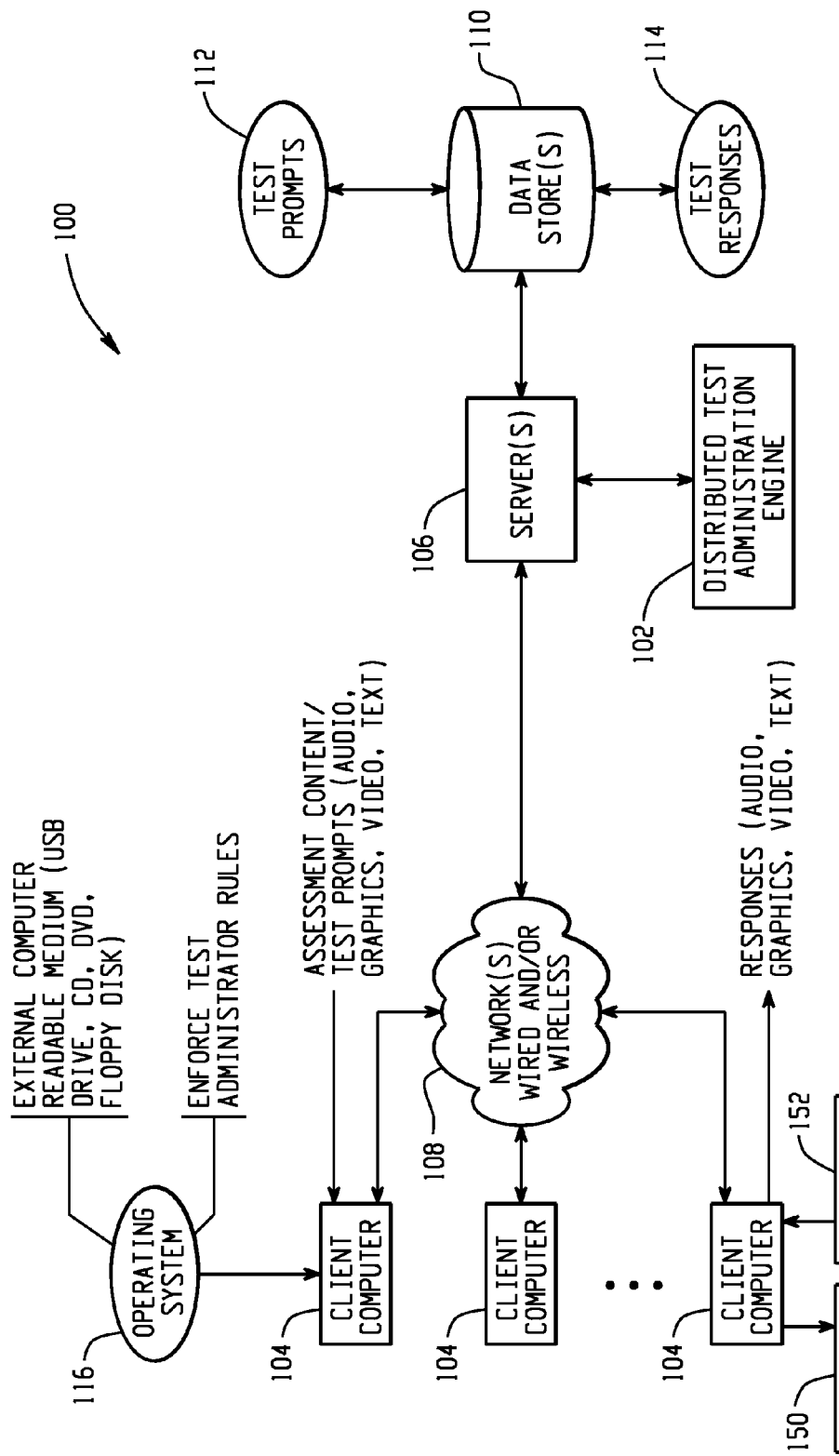
FIG. 1 is a block diagram depicting an exemplary computer-implemented distributed test administration engine.

Conventional computer-based testing paradigms tend to fall into one of two categories. The first category of traditional systems utilizes dedicated computers at a testing center or school computer lab. Such a testing center may contain a number of dedicated computers, such as desktop computers, for use in providing an assessment to a user and receiving responses. The dedicated computers are secure because the user cannot run any software applications other than those authorized by the administrator, nor can the user put unauthorized information on the computer, or take unauthorized information from the computer. In this way, the integrity of the assessment being provided is maintained, such that the same or a similar assessment may be provided to other users at another time, without the threat of later users having an unfair advantage through prior access to assessment materials.

Such a testing-center implementation offers assessment security as well as a consistent psychometric attributes across testing of a number of users. Consistent psychometric attributes enable confidence in the fairness of the assessment administration. Because the computers utilized are similar, dedicated computers, performance of the dedicated computers remains very consistent across the population of computers utilized.

However, the testing-center implementation can be costly and rigid in nature. Large overhead costs may be required to set up a testing center that includes a number of dedicated computers. Additionally, testing center configurations tend to lack mobility, where dedicated computers are often desktop computers that are connected to a server via a wired connection.

A second category of computer-based testing utilizes test-taker hardware (e.g., a laptop computer) for providing assessment materials and receiving user assessment responses. In such a configuration, a user is conventionally provided a software application to download or install onto his computer prior to the day of assessment administration. The software application includes assessment materials, such as the prompts that will be provided for the assessment, in an encrypted form. On the day of the assessment, the user brings his laptop or other hardware that has the pre-installed assessment software to a testing center. The assessment materials are unlocked and decrypted, such as through the use of a password provided by an administrator at the testing site. The assessment is provided on the laptop to the test taker, and responses entered via laptop input devices are recorded and saved on the laptop internal memory (e.g., non-volatile hard disk drive). At a later time, after the assessment administration has ended, the test taker uploads his recorded responses to a server through the Internet when the laptop first establishes Internet connectivity following the assessment administration.

While the use of test-taker hardware offers potential cost savings, such a paradigm can suffer from significant psychometric consistency issues. Different hardware capabilities across the population of test taker hardware used for the assessment may result in widely differing system performance. Additionally, differences in underlying system software setups may result in significant compatibility issues. For example, conflicts may arise with assessment software based on an underlying operating system or concurrently operating processes and applications such as firewalls and virus scanning applications. A test taker may be faced with the consequences of such incompatibility mid-assessment, such that the psychometric attributes of that test taker's assessment are materially different from those of other test takers.

The test-taker-hardware-implementation also may be prone to multiple test security concerns. First, the test assessment materials may be present on the test-taker hardware well prior to the start of the examination. While the test assessment materials may be present in an encrypted form, such encryption could be broken, allowing access to test questions and other materials, compromising the assessment to be given. Additionally, processes or software (e.g., a key logger, a screen capture application) running concurrently during the assessment administration can snoop and save one or both of assessment prompts and provided responses for later access. The assessment materials or responses stored on the test taker's hardware, while encrypted, may likewise be subject to attack after the assessment, potentially permitting a test taker to alter responses before uploading them to the administrator. In addition, assessment materials and responses could potentially be provided to subsequent test takers, allowing unfair preparation for the later administered assessment, compromising the test integrity.

FIG. 1 is a block diagram depicting an exemplary computer-implemented distributed test system 100 according to the present disclosure that may overcome the foregoing difficulties. A distributed test administration engine 102 offers a framework for administering an assessment or test in a client/server architecture in a low cost manner by utilizing some hardware (e.g., laptop computers, tablet computers) provided by the test takers. Such a configuration can offer overhead savings over conventional computer-based testing paradigms while maintaining a high degree of confidence in the psychometric fidelity of the testing process.

The distributed test administration engine 102 provides a platform for administering and carrying out an examination that may mitigate or eliminate the drawbacks present in prior systems. The distributed test administration engine 102 provides a platform for users of client computers 104 to take a secure examination that is psychometrically consistent with assessment experiences of other users (e.g., same user interfaces displayed at same resolution). A user of a client computer 104 accesses with his own hardware the distribution test administration engine 102, which is hosted on one or more servers 106, via one or more local networks 108. The one or more servers 106 are connected to one or more data stores 110. The one or more data stores 110 may contain a variety of data that includes test prompts 112 as well as received test responses 114. The received test responses may be stored in the one or more data stores 110 for later scoring or may be transmitted to other server computers, such as via an Internet or other connection for scoring away from the test site.

In one example, the distributed test administration engine 102 operates via the local network 108 in conjunction with a client computer of the user 104. In one example, the local network 108, the client computers 104, and the servers 106 are not connected to the Internet enabling the test session to continue uninterrupted in the event of an Internet failure at the test site. The client computer is booted using a secondary operating system that is accessed from a computer readable medium that is provided by an administrator of the assessment only on the day of the assessment, such as a USB flash drive or other USB connectable memory. The client computer 104 sends a broadcast message to check for the existence of a local server 106 and to establish communication with to the local server 106 (automatically or upon user request after establishment of network connectivity, such as establishment of secure wired or wireless network connectivity). Upon establishing communication, a client application is received from the local server 106, assessment content is received from the local server 106 at the client computer 104, and the received client application is used to present the assessment content to the user. User responses are received at the client computer 104 and are transmitted to the local server 106.

The distributed test administration system 100 offers an implementation that may be less costly and more flexible than a dedicated computer implementation by relying on test taker hardware. Because users bring their own hardware, dedicated computers do not need to be provided. Also, no dedicated test site is required to administer an assessment using a distributed test administration system 100. "Temporary" test sites, such as a ball room at a hotel, may be utilized, where a local server housing the distributed test administration system 100 is set up and operated to communicate with a number of test taker computers to administer the assessment. The exact number of test takers for an assessment does not need to be known prior to the assessment, as long as the temporary site has enough physical space to accommodate the test takers.

The distributed test administration engine implementation also offers psychometric consistency across test takers through use of the external medium operating system. The secondary operating system and associated software maintains a sterile assessment operating environment on the client computer 104, where the primary operating system may be disabled and where concurrently running processes and software are strictly controlled to maintain security for the test being administered. The secondary operating system and software further require test taker hardware to meet minimum hardware performance thresholds to help ensure consistent test administration characteristics across multiple test takers. Thus, variations in test taker hardware are only permitted when those variations will not inhibit the ability of the test taker.

Further, the distributed test administration system 100 can offer significantly enhanced security over prior systems. For example, because test assessment materials are not present whatsoever on the test taker hardware prior to the assessment administration day, there is no threat of unauthorized access to any assessment software that might otherwise be installed before the day of the test. Additionally, test responses may be transmitted to the local server 106 during the assessment administration without ever storing those responses in non-volatile memory at the client computer 104, or at least such that the test responses are not stored on any non-volatile storage provided by the test taker (e.g., the internal hard disk drive of the client computer 104). For example, the test responses may be stored only in volatile memory of the test taker hardware and never stored in non-volatile memory of the client computer 104. Alternatively, the test responses may be stored on an external storage medium provided by the test administrators (e.g., a USB flash drive). The test responses may be transmitted after a final prompt has been answered, or a user response to a first assessment prompt may be transmitted while a second prompt is being displayed and answered (e.g., nearly in real time). Alternatively, the client application can permit user responses to be temporarily stored on the internal storage of the client computer 104 (i.e., on the internal hard disk of the test taker's computer 104), and following transmission of a user response to a local server 106, the user response can be deleted from the test taker client computer 104 (e.g., both non-volatile and volatile memory) or from the external computer readable medium.

Assessments may be provided by the distributed test administration engine 102 according to a variety of protocols, as dictated by the test administrator. For example, a high stakes exam (e.g., a state bar exam) may be administered such that all test takers begin the assessment at the same time. In another example, students taking a Test of English as a Foreign Language (TOEFL) exam may begin the assessment when they are ready, regardless of the status of other test takers, where the time limit of that test taker's exam is tracked by either the distributed test administration engine 102 or test administration software running on the client computer 104.

The distributed test administration engine 102 may transmit test prompts to the client computers once an assessment has begun. The test prompts may be transmitted in an encrypted form, to maintain security from unauthorized access attempts, such as attempts at snooping the wireless or wired connections. By transmitting the test prompts after the commencement of the assessment, security of the test prompts is ensured. When assessment content is provided prior to the start of the examination in conventional approaches (e.g., in an encrypted form with pre-loaded assessment software), unauthorized access to the assessment content could be gained, such as by cracking the encryption that protects the assessment content stored on the test taker's client computer 104.

Upon receiving a test prompt, a client computer 104 displays the test prompt and receives a user response from the test taker response, such as a signal from a keyboard or microphone. After user responses are received at the client computer 104, the user responses are transmitted to the distributed test administration engine 102 for storage and scoring. Security may be improved by transmitting the user responses in an encrypted form to prevent unauthorized access, such as via network snooping.

Security may be improved by requiring any storage of user responses on the client computer 104 to be encrypted, because responses stored in non-encrypted form may be susceptible to unauthorized capture. In an alternative example, user responses are not permitted to be stored on the test taker's own non-volatile memory of the client computer 104. Entered user responses may be buffered, however, in volatile system memory of a client computer 104. User responses may be immediately transmitted (e.g., transmitted without purposeful delay) to the distributed test administration engine 102 and deleted at the client computer 104, or may be transmitted and deleted in batches. If an external computer storage medium used to provide the secure secondary operating system has writeable memory (e.g., a USB flash memory), then the external computer storage medium may be used for buffering of user responses prior to transmission to the distributed test administration engine 102. (In some configurations, such a constraint may be difficult to implement, such as when client responses are large in nature (e.g., spoken audio responses), where bulk storage of non-volatile memory may be used.)

Assessment content or test prompts may come in a variety of forms and may include audio, graphics, video, and text materials, depending on the nature of the assessment. Such content is provided to the test takers via the client computer 104. Graphics, video, and text may be displayed via a computer display, while audio materials may be provided via a speaker or earphones 150. User responses may be entered by the test taker and transmitted to the distributed test administration engine 102. Test responses may be provided in a number of forms, such as text or drawings entered or modified using a keyboard or mouse. Additionally, recorded audio test responses may be inputted to a client computer 104 using a microphone 152.

As noted previously, the booting of the secondary operating system can be done via an external computer readable medium 116, and the client computer 104 may be operated in a secure state during administration of an examination using the secondary operating system that is provided via the external computer readable medium 116. The external computer readable medium containing the secondary operating system may come in a variety of forms, such as a USB flash drive, a CD, a DVD, or a floppy disk. The secondary operating system provides a standard, secure, and consistent assessment environment across the population of test takers despite the use of client computers of disparate types and capabilities. The secondary operating system can strictly control the assessment environment by limiting processes and applications that can be running during the administration of an assessment and by disabling the primary operating system of the client computer 104 (e.g., by preventing the primary operating system from booting). Such limitations can improve security by limiting the ability of non-approved software to snoop data associated with an ongoing assessment.

The secondary operating system also improves test reliability by executing test administration software on a "clean slate." Such operation minimizes the risk of improper performance of test administration software based on unexpected interactions between the test administration software and other concurrently running software (e.g., virus scan software, firewall software, viruses or other malicious software). By "locking down" the client computers via the secondary operating system, a consistent assessment can be provided to test takers despite the use of different hardware having different capabilities, increasing the confidence that psychometric attributes are consistent across assessment sessions and that assessment has been administered fairly.

Figure 2A:
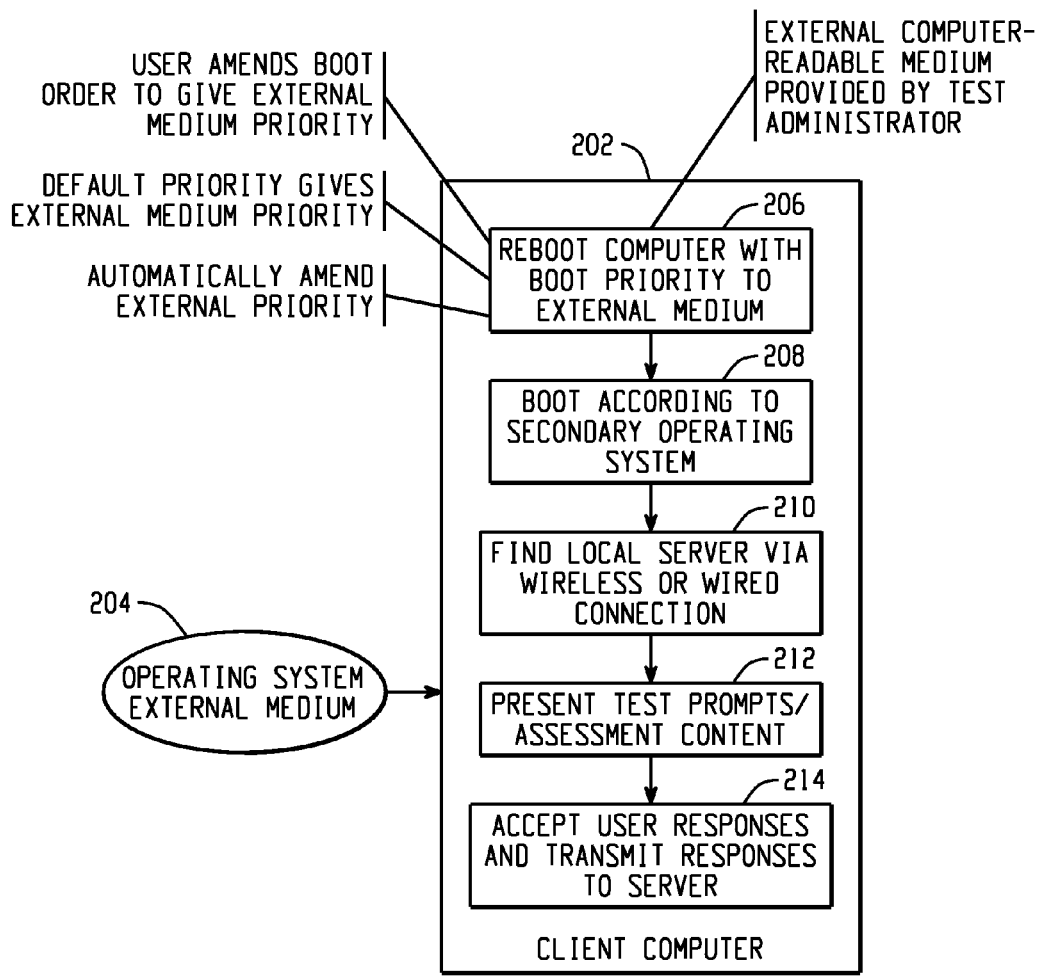
FIG. 2A is a block diagram depicting exemplary operations of a client computer including rebooting using a secondary operating system.

FIG. 2A is a block diagram depicting a flow of operations of a client computer for test administration including rebooting using a secondary operating system. A client computer 202 receives a secondary operating system via a computer readable medium 204 that is provided by an administrator only on the day of an assessment (e.g., where the computer readable medium 204 is external to the client computer 202). For example, a test taker may plug a USB flash drive into a USB port on client computer 202 provided by the test taker. The USB flash drive may be provided to the test taker upon checking into a test site, where the USB flash drive is returned following completion of the test.

Upon a reboot of the client computer 202, the secondary operating system 204 provided on the external medium is loaded instead of the primary operating system resident on the client computer, as indicated at 206. The preference for loading the secondary operating system 204 provided on the external medium over the primary operating system may be dictated to the client computer in a number of ways. For example, a boot order for the Basic Input/Output System (BIOS) for the client computer may be modified to check for a bootable operating system on the input medium containing the secondary operating system 204 before the input medium (e.g., typically a non-volatile hard disk drive) that stores the primary operating system. As an example, a USB port may be selected as a higher priority than the non-volatile hard disk drive, such that the secondary operating system 204 on a USB flash drive is loaded when the USB flash drive is connected to the computer instead of the primary operating system.

The boot priority may be changed in a variety of manners. The test taker may enter the BIOS settings and manually change the boot priority by pressing a BIOS hotkey during a boot cycle of the client computer as directed by instructions from the assessment administrator. Alternatively, a default boot priority may already be in place in the BIOS settings that dictates that the input mechanism associated with the external medium 204 is checked before the non-volatile hard disk drive. Such a configuration may be common where the external medium is a compact disc (CD), as many computers check a CD or DVD drive for a bootable operating system by default. In another configuration, certain test administration software may be configured to automatically amend the BIOS boot order, such that no user interaction is required.

The type of external medium selected for providing the secondary operating system 604 may be selected based on a number of factors including cost, ease of use, and portability. Additionally, certain secondary operating systems may be limited to certain types of external media for boot loading (e.g., certain versions of the Microsoft Windows® operating system may only boot from a USB flash drive, while a UNIX operating system may boot from a USB flash drive, a CD, a DVD, or a floppy disk). In one example, a Windows Vista® operating system is provided as the secondary operating system via a Spyrus® Secure Pocket Drive USB flash drive. In another example, a UNIX based secondary operating system may be booted from a flash drive, CD, DVD, or floppy disk.

Figure 2B:
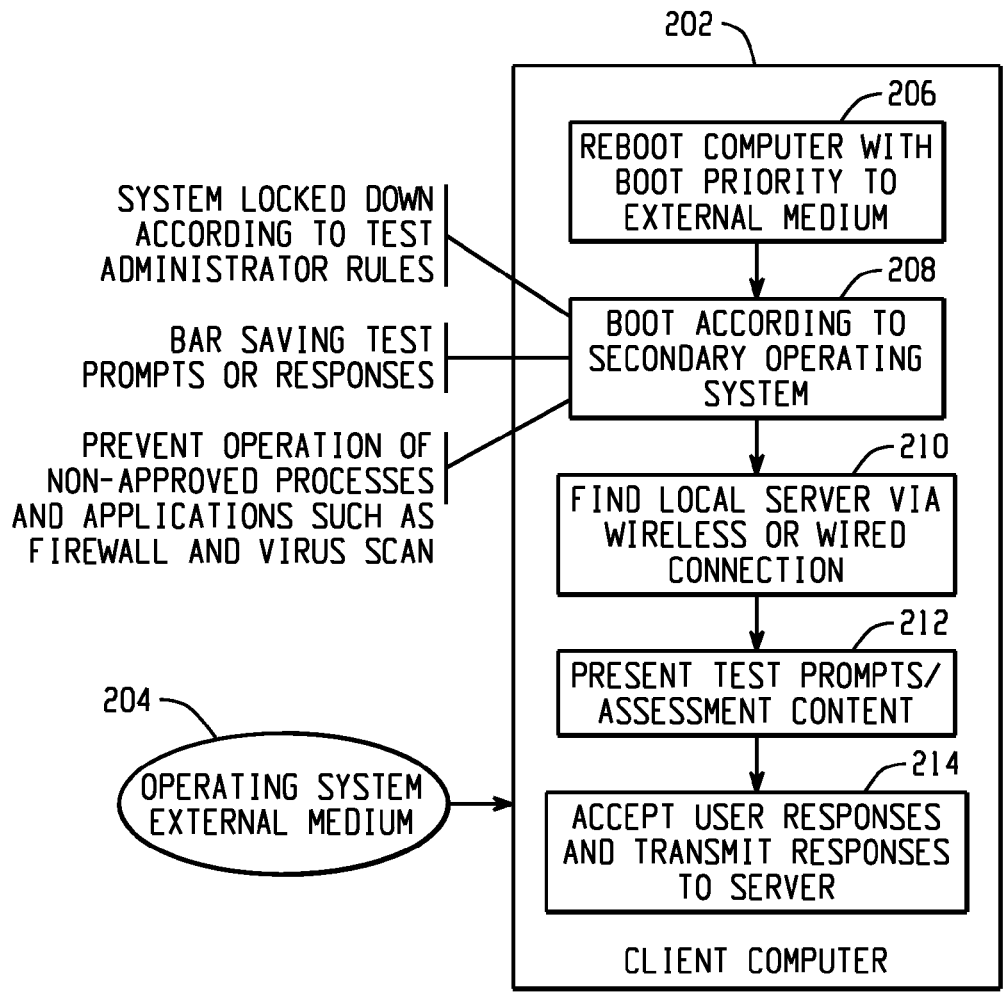
FIG. 2B is a block diagram depicting exemplary operations of a client computer during a test administration including booting the client computer according to a secondary operating system provided via the external computer readable medium.

FIG. 2B is a block diagram depicting certain operations of a client computer during a test administration including booting the client computer according to the secondary operating system. Following a reboot 206 of the client computer 202, the client computer boots according to the parameters of the secondary operating system, as indicated at 208. The boot operation 208 includes the loading and operation of drivers and software required for operation of the secondary operating system. The settings of the secondary operating system or test administration software may be set to operate the client computer 202 in a locked down mode according to test administrator rules. Such rules may prohibit the unauthorized capturing or saving of test prompts or test responses. The test administrator rules may also prevent the operation of any non-approved processes and applications including firewall applications and virus scan applications. In another example, the commencement of an assessment administration may be prevented if unauthorized "rogue" processes are detected. Upon booting of the client computer 202 to initiate the secondary operating system, test administration software may be loaded and run, or a link (e.g., an icon) may be provided for access to the test administration software.

Figure 2C:
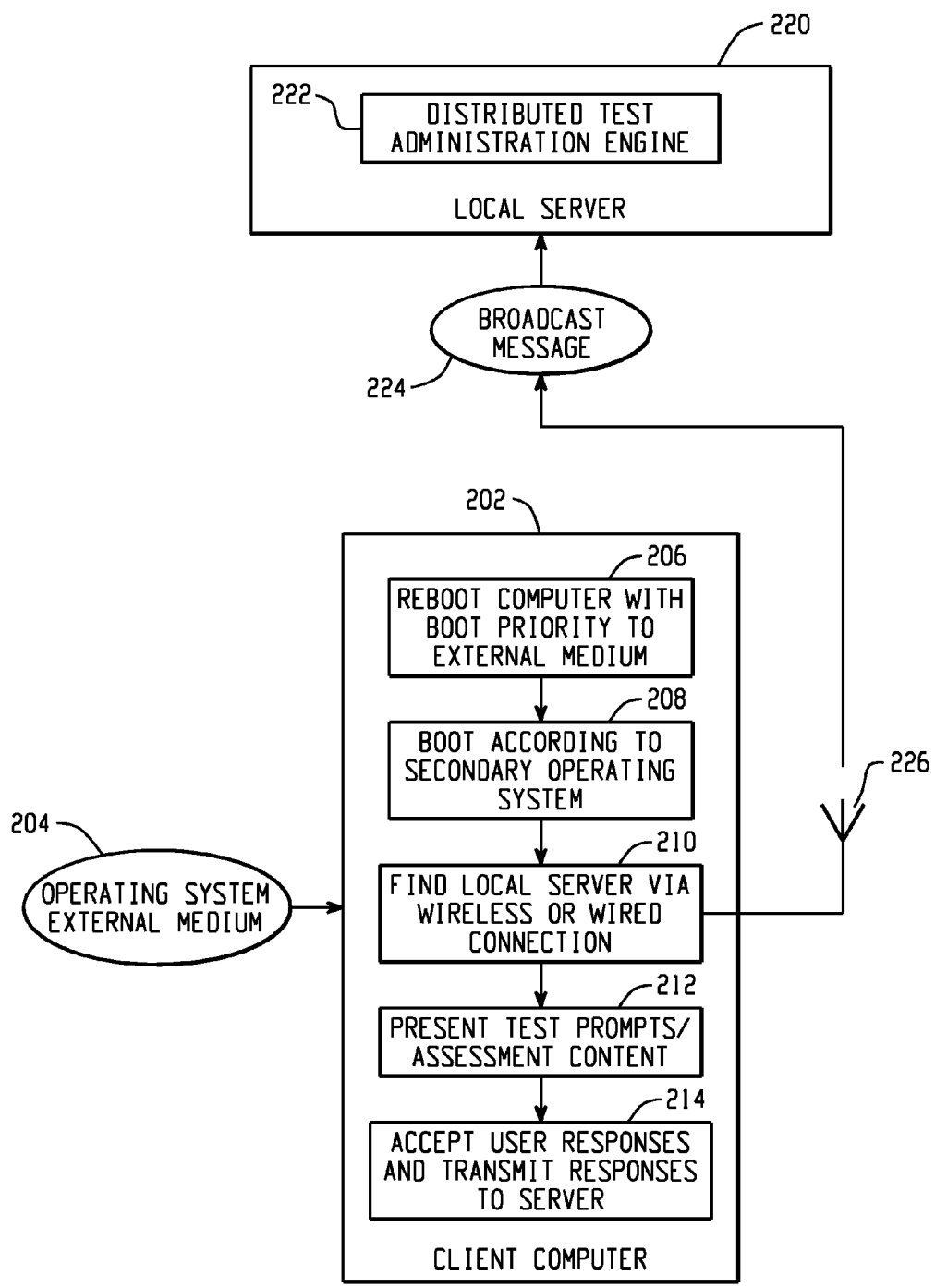
FIG. 2C is a block diagram depicting exemplary operations of a client computer during a test administration including establishing communication with a local server.

FIG. 2C is a block diagram depicting example operations of a client computer during a test administration including establishing communication with a local server 220. Upon initialization of the test administration software, the client computer 202 is instructed to attempt to establish communications with a local server 220 that is responsive to a distributed test administration engine 222. As indicated at 210, the client computer 202 attempts to establish communication by outputting a broadcast message 224 via a wired or wireless 226 communication device. Upon receipt of the broadcast message 224, the local server 220 may communicate with the client computer 202 to establish and confirm communications. Upon establishment of communications between the client computer 202 and the local server 220, the assessment administration may be permitted to begin. If no communications can be established, commencement of the test administration may be prevented until trouble shooting by the administrator can be carried out.

Figure 2D:
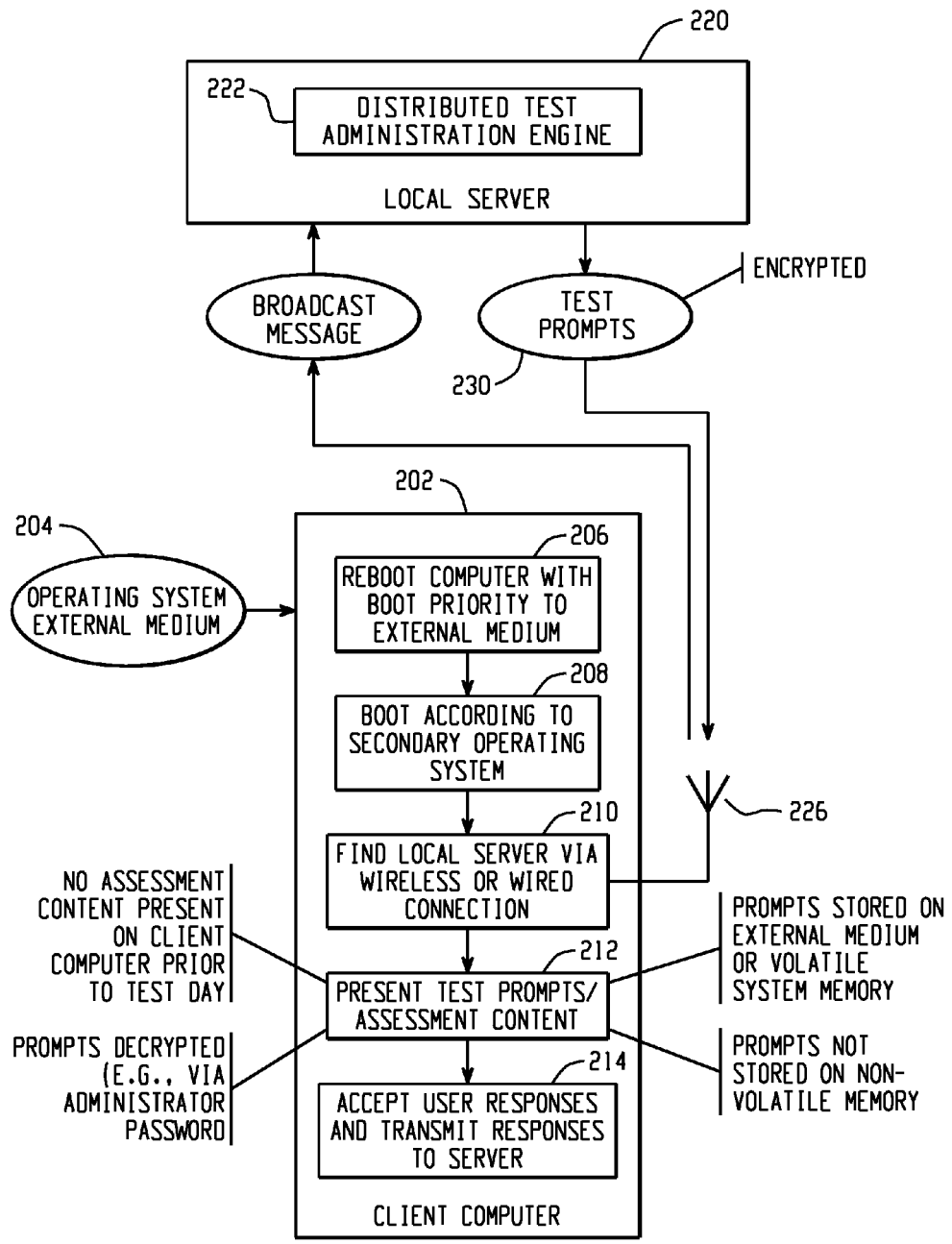
FIG. 2D is a block diagram depicting exemplary operations of a client computer during a test administration including the receiving of test prompts and providing the test prompts to the test taker.

FIG. 2D is a block diagram depicting example operations of a client computer during a test administration including the receiving of test prompts/assessment content and providing the test prompts/assessment content to the test taker at the client computer 202. Upon establishment of communications between the client computer 202 and the local server 220, test prompts 230 are received by the client computer 202 from the distributed test administration engine 222 via the local server 220, as indicated at 212, such as via a wireless data connection 226. Test prompts 230 may be received incrementally, as the test taker progresses through the assessment, or via one or more batches. Test prompts 230 may be deleted from the client computer 202 or other storage as the test prompts 230 are completed or in one or more batches. Test prompts 230 are provided to the test taker for response in an appropriate form at an appropriate time during the assessment administration.

The test prompts 230 may be provided by the local server 220 in an encrypted form to increase assessment security, such as to foil wireless network snooping attempts. The encrypted test prompts 230 may be decrypted, such as using a password provided or entered by a test administrator or using a symmetric or asymmetric decryption key (e.g., any suitable encryption algorithm as understood by one of ordinary skill in the art such as DES, PGP, AES) that can be received from the local server or other source. To bolster security, in some configurations, test prompts 230 may not be permitted to be stored on non-volatile (e.g., hard drive) storage at the client computer. Instead, the test prompts 230 may be stored on volatile memory of the client computer 202 or on the external medium 204 containing the secondary operating system, if the external medium 204 is amenable to such storage. The transmission of test prompts 230 only during actual testing can improve security by not storing test prompts 230 on the client computer 202 at any time prior to the assessment, where the test prompts 230 would be otherwise susceptible to tampering.

Figure 2E:
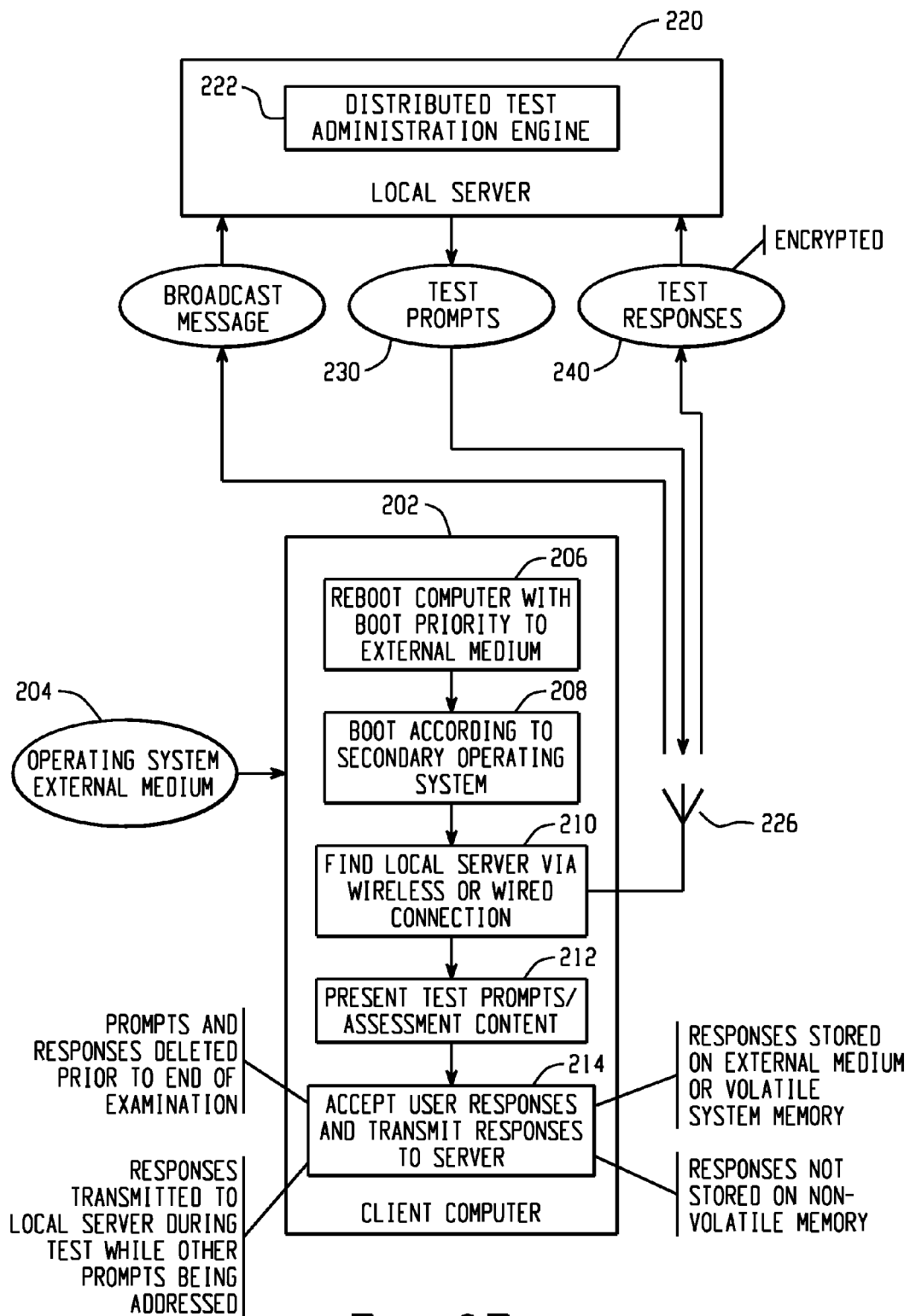
FIG. 2E is a block diagram depicting exemplary operations of a client computer during an assessment administration including the receipt and transmission of test responses.

FIG. 2E is a block diagram depicting example operations of a client computer during an assessment administration including the receipt and transmission of user responses 240. After the client computer 202 has received and displayed test prompts 230 to the test taker, the test taker inputs user responses 240 via an appropriate input device. The received user responses 240 are transmitted to the distributed test administration engine 222 via the local server 220 for storage and later scoring, as indicated at 214. The transmission of the user responses 240 may be performed using a wired connection or the wireless connection depicted at 226.

The user responses 240 may be transmitted to the distributed test administration engine 222 according to a number of protocols including singly or in batches during the administration of the assessment or in bulk at the end of the assessment. Storage of the user responses 240 at the client computer 202 may be limited to volatile system memory of the client computer 202 or on the external medium 204 containing the secondary operating system. In some configurations, storage of the user responses 240 is not permitted on non-volatile memory of the client computer 202. In an alternative embodiment, user responses may be stored temporarily on non-volatile memory of the client computer 202, and then deleted with secure wiping by the client application after the assessment is complete. Certain clean-up tasks may be performed at the client computer, including the deletion of test prompts 230 and test responses 240 to prevent access after the assessment administration. Such clean-up tasks may be performed incrementally during the assessment administration or after completion of the test.

Figure 3:
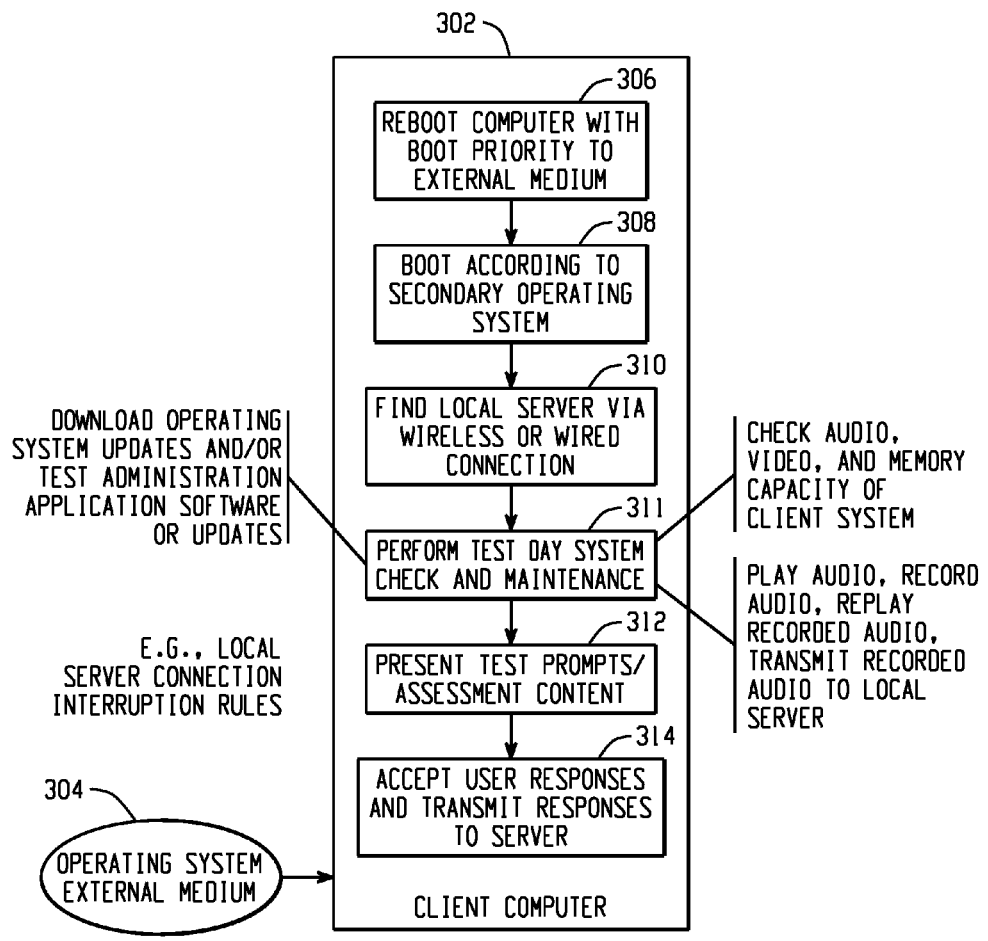
FIG. 3 is a block diagram depicting exemplary operations of a client computer during a test administration including performing a test day system check and maintenance.

FIG. 3 is a block diagram depicting example operations of a client computer during a test administration including performing an assessment day system check and maintenance. On the day of an assessment administration, the client computer 302 may carry out steps 306, 308, 310, 312, 314 like steps 206, 208, 210, 212, 214 previously described, and may perform a system check and maintenance, as indicated at 311. The system check may check the audio, video, and memory capacity of the client computer 302. The system check may also play audio, record audio, replay the recorded audio, and transmit the recorded audio to a local server to ensure proper audio functionality, should such functionality be necessary for the present assessment.

The system check and maintenance 311 may also load, download, or update a test administration software application. Such software may be preloaded and updated based on data received from the local server or the external computer medium 204 containing the secondary operating system. If the test administration software application is not preloaded, then the software may be downloaded from the local server or loaded from the external computer medium 204. The loaded/downloaded/updated test administration software application may have parameters for the present assessment loaded. Those parameters may include assessment rules dictated by the assessment administrator, such as procedures to be taken upon loss of connection to the local server (e.g., pausing the assessment, allowing restarting on the same or different computer), time limits for the assessment, and an indication of the necessity of audio playing and recording functionality. Upon successful system checks and maintenance operations 211, the assessment administration may begin.

Figure 4:
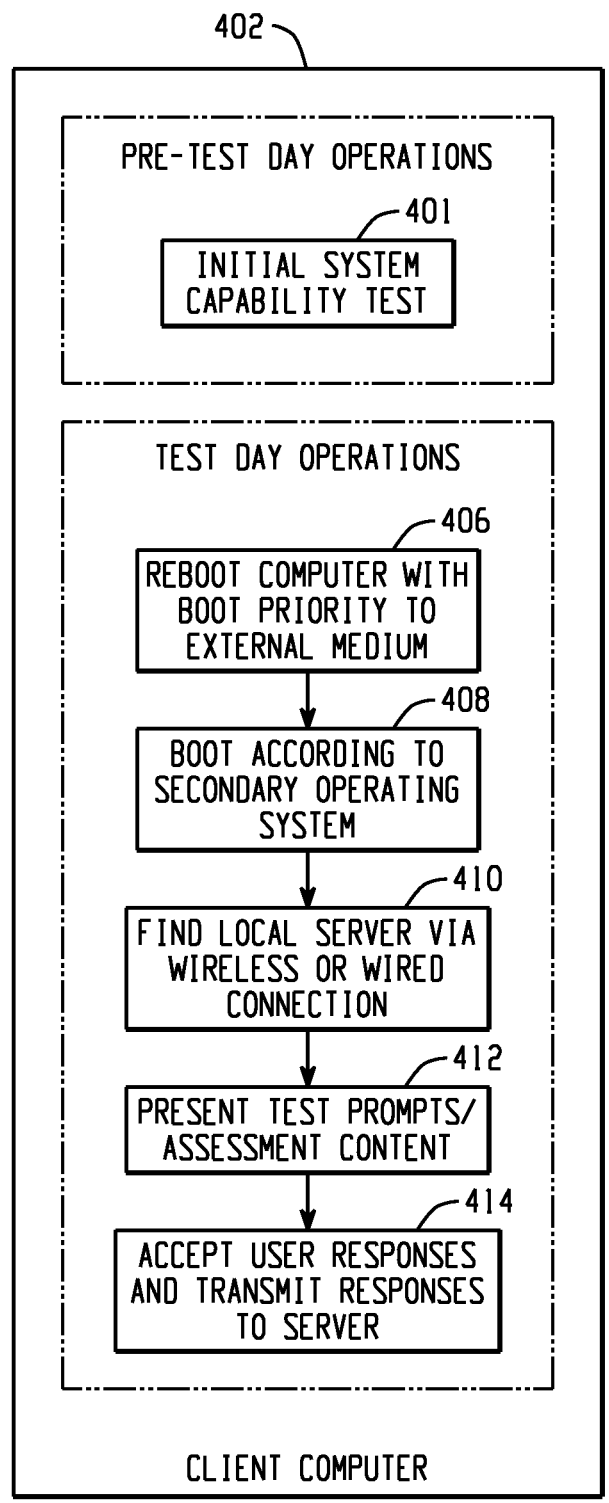
FIG. 4 is a block diagram depicting exemplary operations of a client computer including a pre-test day system capability check.

FIG. 4 is a block diagram depicting example operations of a client computer 402 including a pre-assessment day system capability check before the assessment day. As discussed in relation to FIG. 3, a client computer may be directed to perform an assessment day system check to ensure that minimum criteria are met on assessment day so that a fair assessment of test taker abilities may be performed. However, a test taker may be interested in checking the sufficiency of their client computer 402 prior to the test day. In FIG. 4, the client computer 402 can perform an initial system capability test 401 prior to the day of the assessment. Such an initial system capability test 401 can be performed via a downloaded system test application that can be accessed via a website of the test administrator or test provider, a received computer-readable medium (e.g., a CD received in the mail), or other mechanism. The system test application can perform a check of system capabilities such as memory, display capabilities, audio playing and recording capabilities, and network connectivity capabilities. The system test application may be adapted to measure client computer parameters that are relevant to a particular assessment that is of interest to the test taker. A passing indication provided by the system test application can indicate that in its current state, the client computer 402 of the test taker would be able to participate in an assessment administration. Steps 406, 408, 410, 412, 414 can be carried out like steps 206, 208, 210, 212, 214 previously described.

Figure 5:
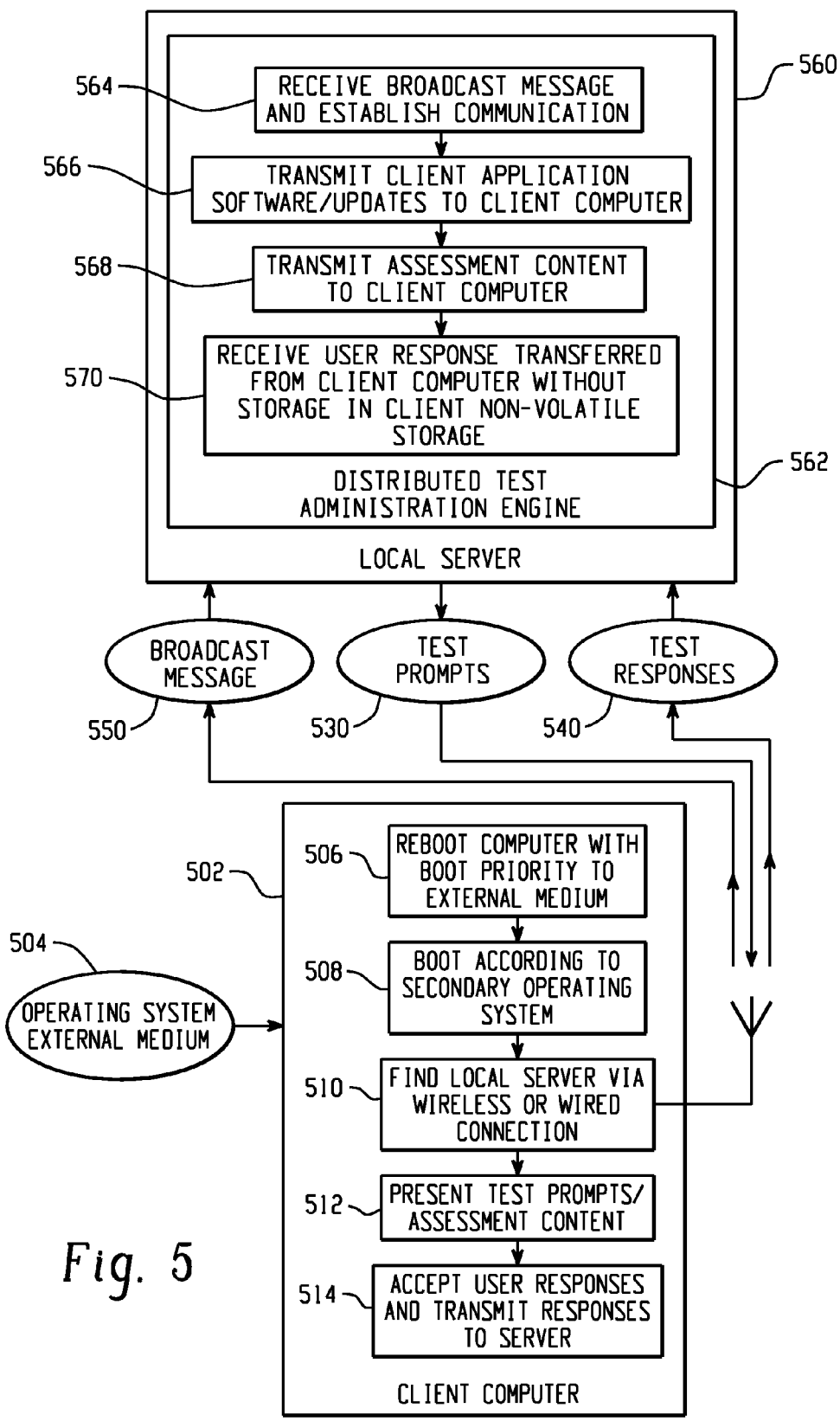
FIG. 5 is a block diagram depicting exemplary operations performed by a local server during administration of an assessment.

FIG. 5 is a block diagram depicting example operations performed by a local server during administration of an assessment. The local server 560 is present at a test site and is set in a ready state, waiting for communications from client computer 502. A client computer 502 is booted according to a secondary operating system 504 provided by the administrator, whereupon the client computer 502 attempts to establish communications with the local server 560 by transmitting a broadcast message 550. Upon receipt of the broadcast message 550, such as via a wireless link, the local server 560 communicates with the client computer 502 to establish communications, as shown at 564. Upon establishment of communications, the local server 560 may provide test administration software or updates to the client computer 502 as indicated at 566 via the distributed test administration engine 562. When the client computer 502 has completed setup operations, such as receiving and loading the test administration software, the local server 560 transmits assessment content to the client computer 502, as indicated at 568. The test assessment content may include test prompts or assessment content 530, instructions for completing the assessment, parameters of the assessment such as time limits, and other data. When a test taker completes a user response 540, the test response 540 is received at the local server 560 for storage, as indicated at 570. The test response 540 may be transmitted to the local server 560 from the client computer 502 without storage in non-volatile memory of the client computer 502 to better ensure assessment security, such as described elsewhere herein.

Figure 6:
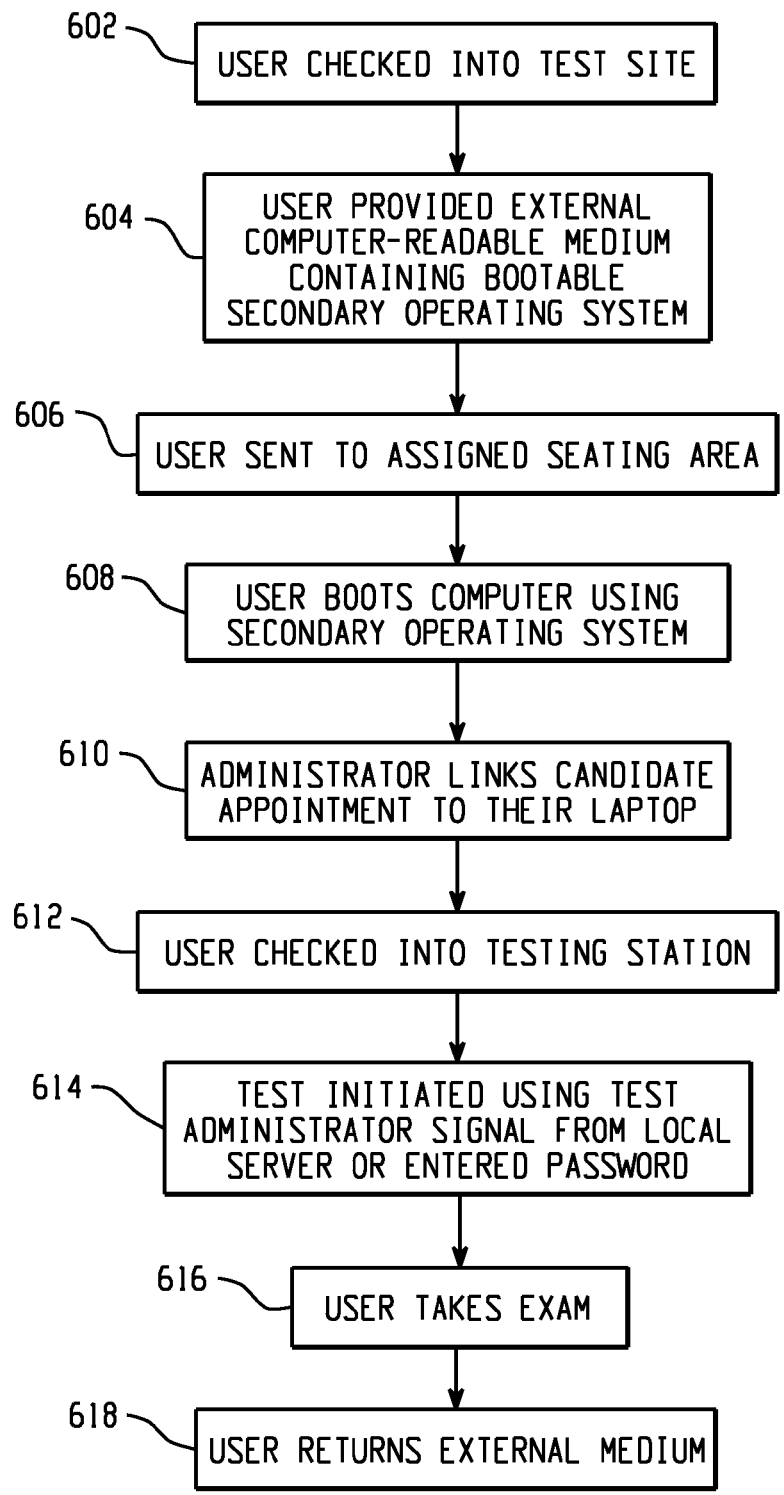
FIG. 6 is a flow diagram depicting an exemplary process for administering an assessment.

FIG. 6 is a flow diagram depicting an example process for administering an assessment. At 602, a test taker is checked into the test site. Checking in may include providing one or more forms of identification, signing certain paperwork, and relinquishing items not permitted in the test site. At 604, the test taker is provided an external computer-readable medium containing a bootable secondary operating system. The test taker is sent to an assigned seating area at 606, and the test taker boots their client computer to run the secondary operating system using the external computer readable medium at 608. At 610, a password may be entered into the test administration software, and a current testing session may be associated with the test taker whose identity has been verified at 602. The password may be provided to the test taker by an administrator, or an administrator may directly enter the password into a client computer. At 612, the test taker may be formally checked into their assigned testing station, which may entail signing and turning in of certain documentation (e.g., an admission ticket). At 614, the assessment may be initiated. The assessment may be initiated based on a signal that is received from a local server or from an action taken by an administrator, such as entry of a password to the test administration software on the client computer. The user takes the assessment at 616, such as by viewing and responding to a number of test prompts. Those responses may be automatically transmitted to the local server during or after the assessment. At 618, the user returns the external medium to an administrator, completing the assessment administration process.

Figure 7:
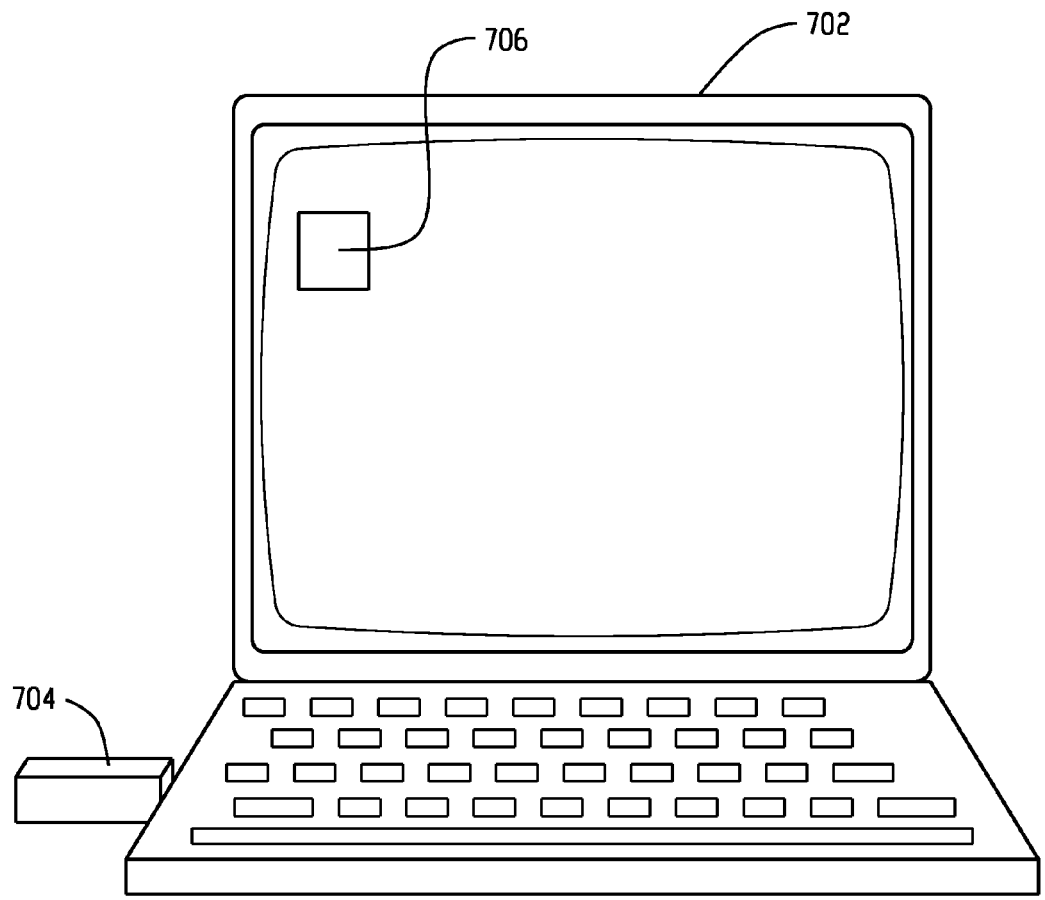
FIG. 7 depicts an exemplary client computer executing a secondary operating system.

FIG. 7 depicts an example client computer executing a secondary operating system. The client computer 702 is a laptop computer provided by (e.g., owned by, borrowed from another, or otherwise belonging to) a test taker. The client computer 702 is supplied a secondary operating system via a USB flash drive 704 connected to a USB port. Following a system reboot, where the USB port is indicated at a higher priority than the non-volatile hard disk for operating system booting, the secondary operating system is loaded and presented to the test taker on the display. The graphical interface provided to the test taker includes an icon at 706 for activating test administration software. Other applications available for access during operation of the secondary operating system are limited by the secondary operating system, according to test administrator guidelines.

Figure 8:
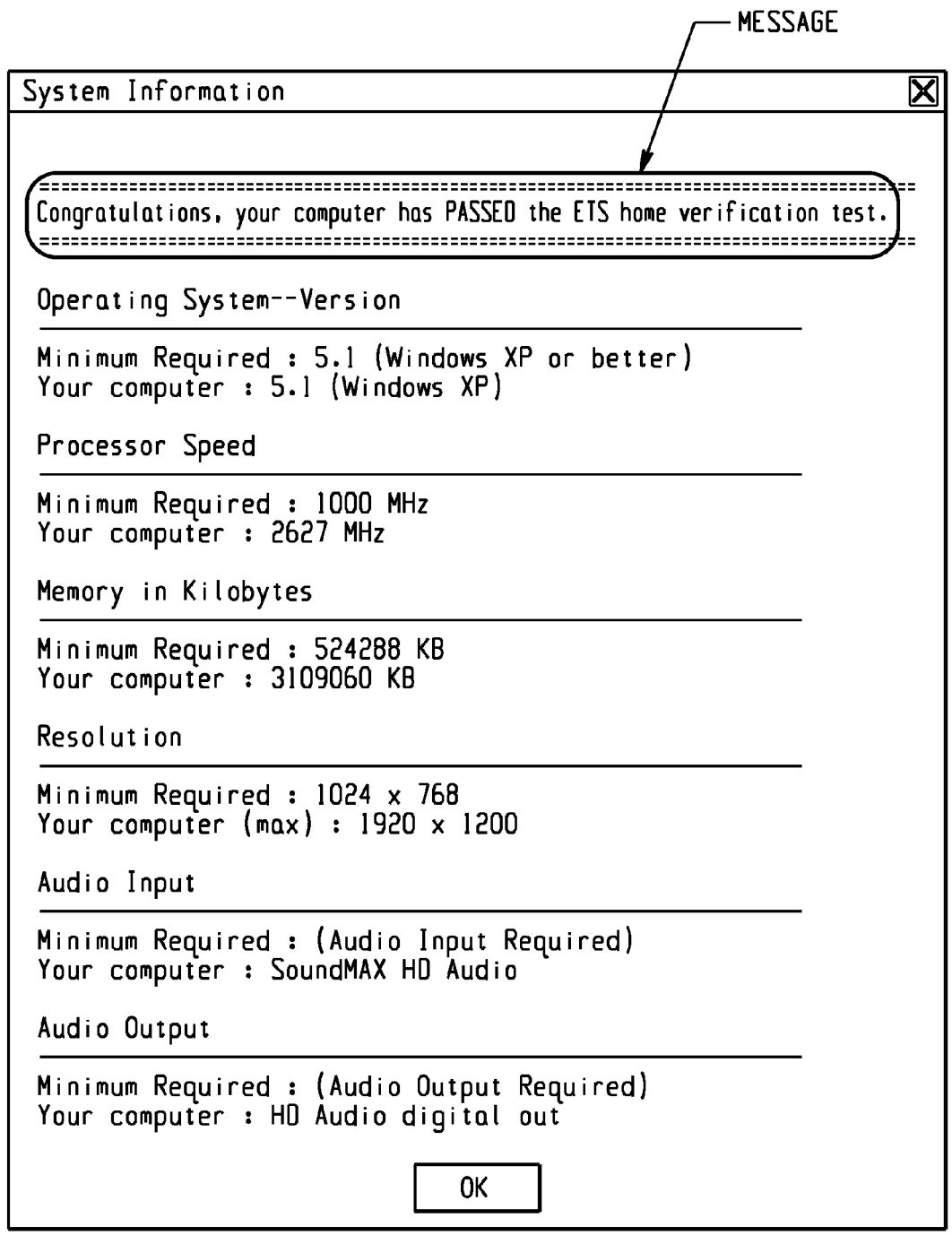
FIG. 8 depicts an exemplary user interface for a pre-test day system capability test.

FIG. 8 depicts an example user interface for a pre-test day system capability test. As discussed with respect to FIG. 3, such a system capability test may be accessed, such as via a website download. The interface of FIG. 8 provides directions for performing a series of system tests to ensure that the user's computer meets minimum hardware specifications for an upcoming assessment administration (e.g., memory capacity, CPU speed). Using the depicted system check, a test taker can determine whether their client computer is capable of participating in an assessment administration in the client computer's current state.

Figure 9:
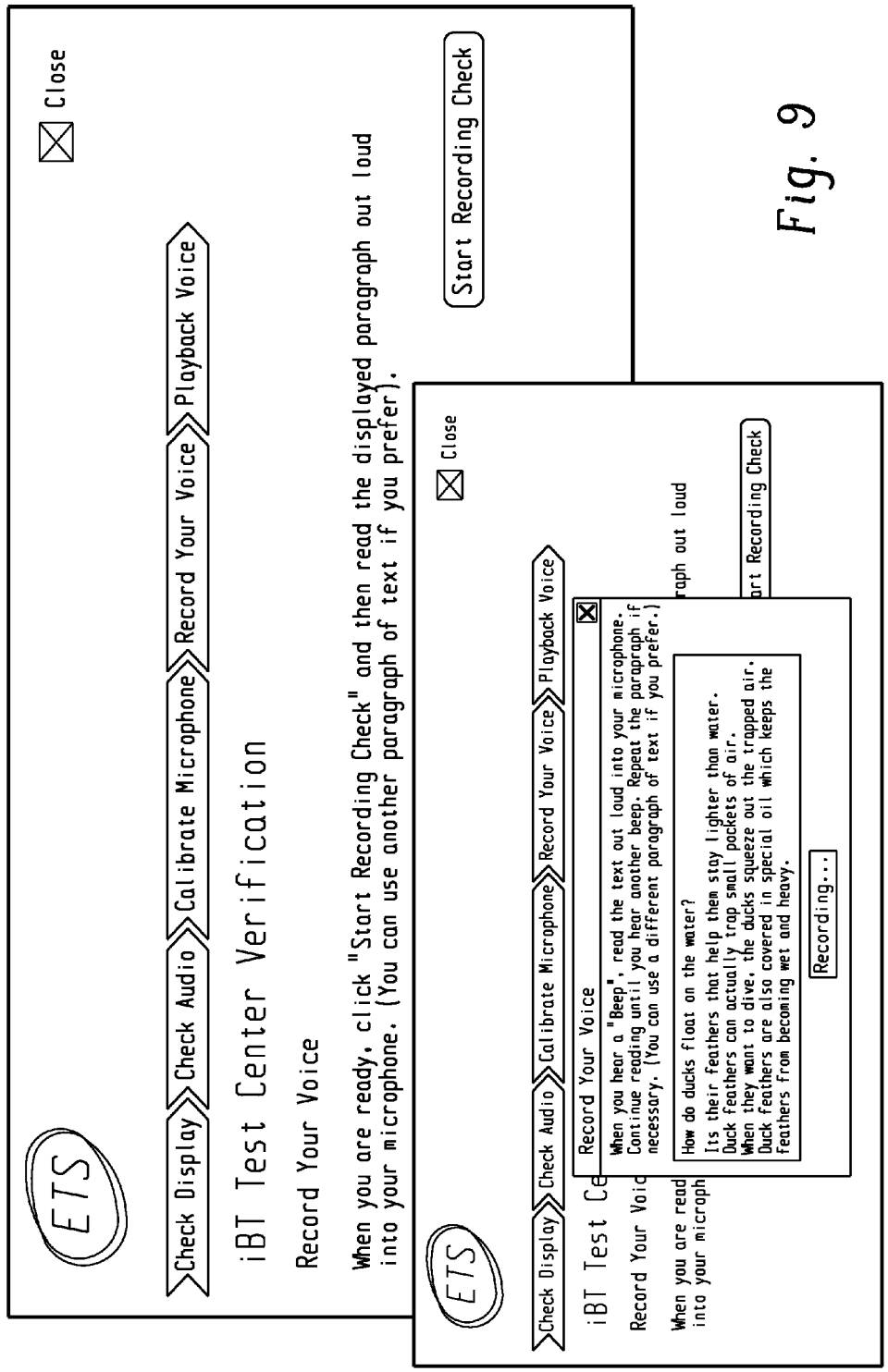
FIG. 9 depicts an exemplary user interface for a test day system capability test.

FIG. 9 depicts an example user interface for a test day system capability test. As discussed with respect to FIG. 4, such a system capability test may be required prior to commencement of a live assessment administration. The interface of FIG. 9 provides directions for performing an audio recording and playback system check. Such a check may be required for a test taker to begin taking a TOEFL exam. Using the depicted system check, a test taker can verify whether their client computer is capable of participating in an assessment administration in the client computer's current state.

Figure 10:
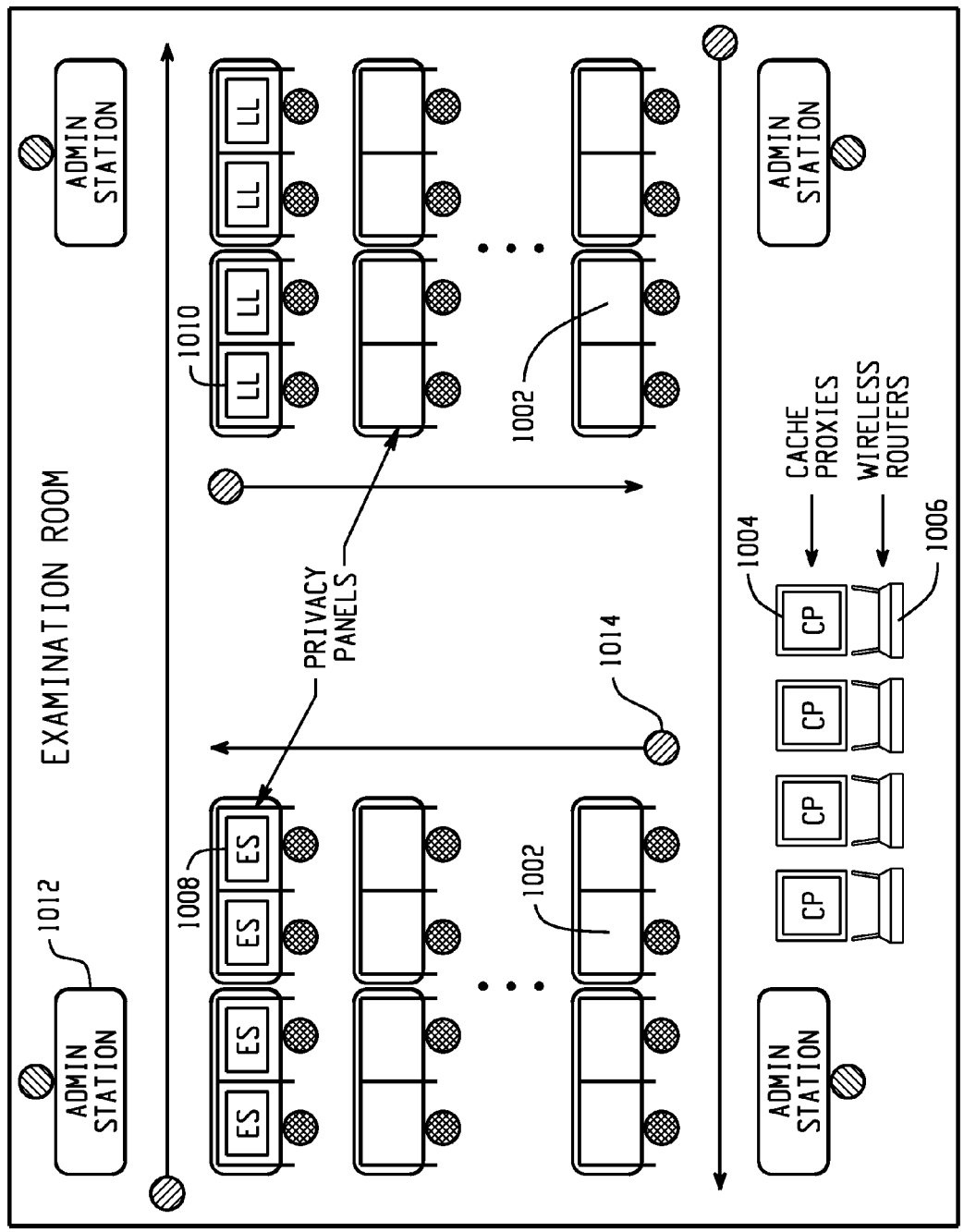
FIG. 10 is a diagram depicting an exemplary test site configuration.

FIG. 10 is a diagram depicting an example test site configuration. Such a test site may be provided at a permanent testing center or at a temporary testing site, such as a hotel or conference center. The site configuration includes a number of general stations 1002, where a test taker may use a client computer (e.g., a laptop) belonging to the test taker to take an assessment. Client computers communicate with local servers 1004, such as via wireless links. The test site also includes a number of Ethernet stations 1008, where client computers communicate with the local servers 1004 via wired connections. The test site further includes a number of loaner laptop stations 1010, where test takers may use provided laptops to take an assessment. Such loaner laptops may be used in emergency situations, where a client computer provided by a test taker cannot be used or malfunctions. A number of administration stations are provided as locations for checking test takers in an out and addressing test taker needs during an assessment administration. Patrol paths are also indicated for assessment proctors 1014.

Figure 11:
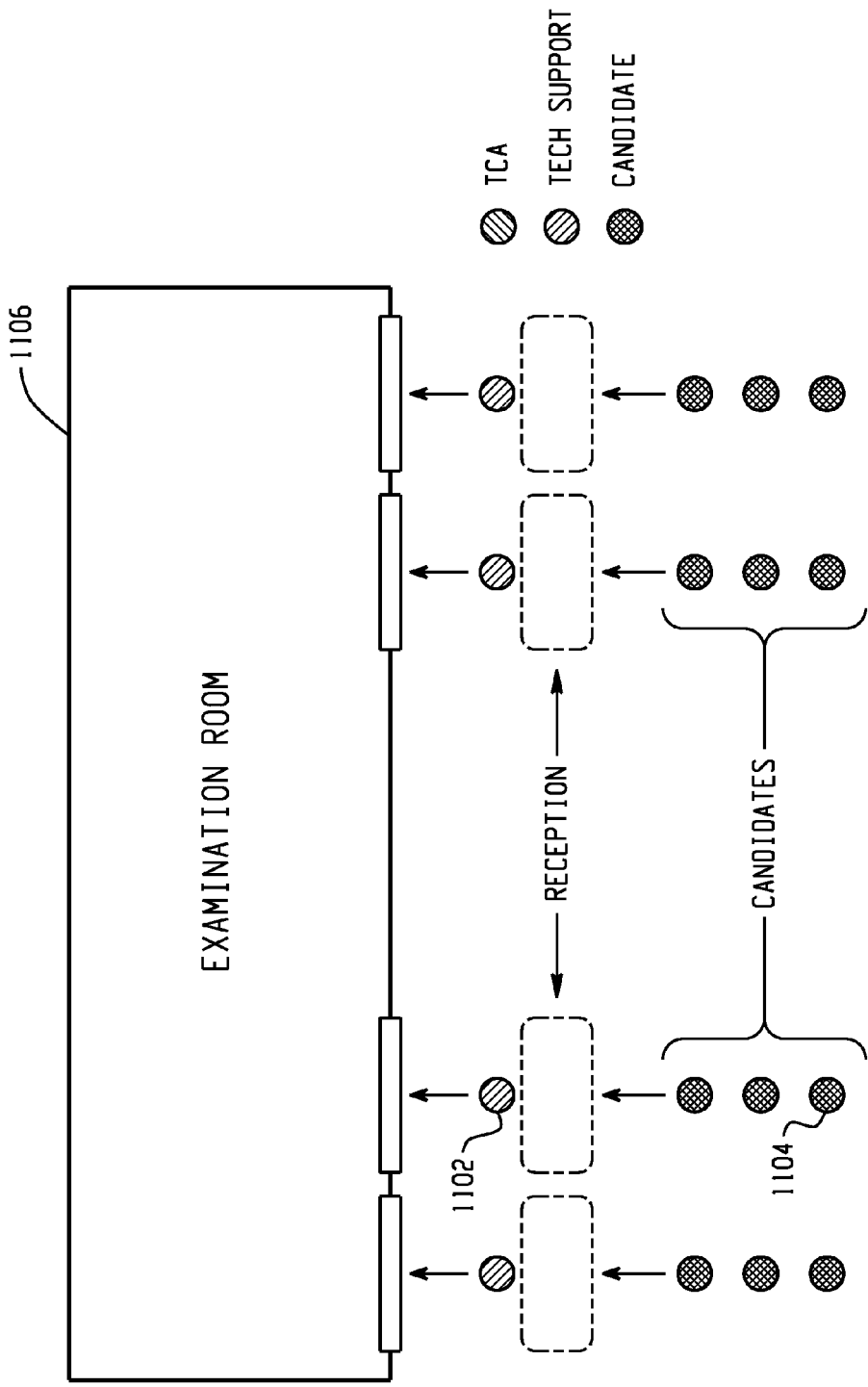
FIG. 11 is a diagram depicting an exemplary initial check-in station for admitting test takers to an examination room.

FIG. 11 is a diagram depicting an initial check-in station for admitting test takers to an examination room. Proctors 1102 are present at tables in front of the examination room. The proctors check test taker 1104 identifications and other documents prior to admitting the test takers 1104 into the examination room 1106. Test taker items that are not permitted in the examination room 1106 may be required to be left in an unsecured area away from the examination room.

Figure 12:
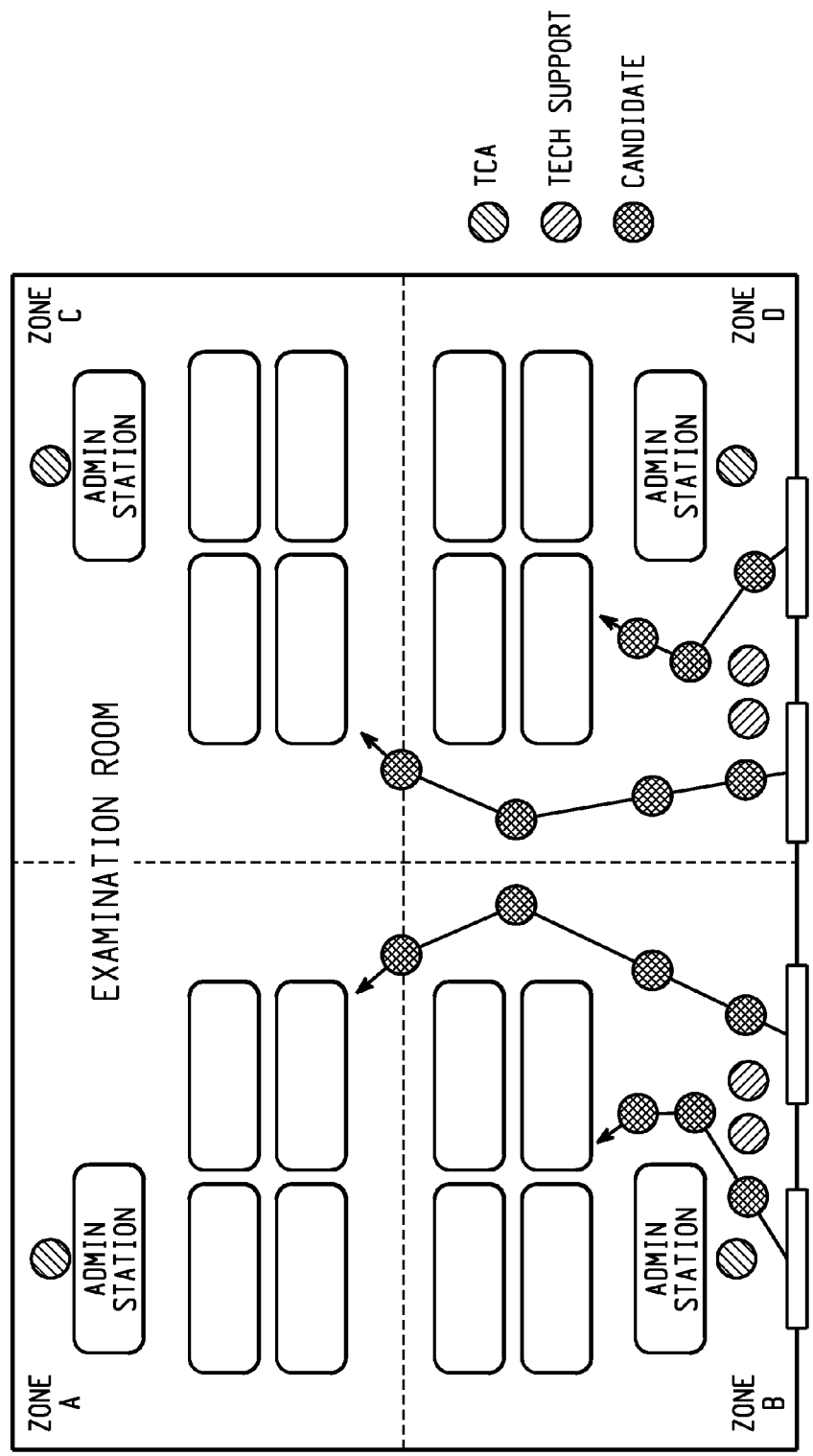
FIG. 12 is a diagram depicting exemplary ingress of test takers into seating zones of the examination room.

FIG. 12 is a diagram depicting the ingress of test takers into seating zones of the examination room. Upon verification of identity and documentation, a test taker is assigned to a seating zone. Seating zones may be determined based on a number of factors including a first letter of the test taker's last name or randomly. Each of the seating zones includes an administration station and a number of testing stations.

Figure 13:
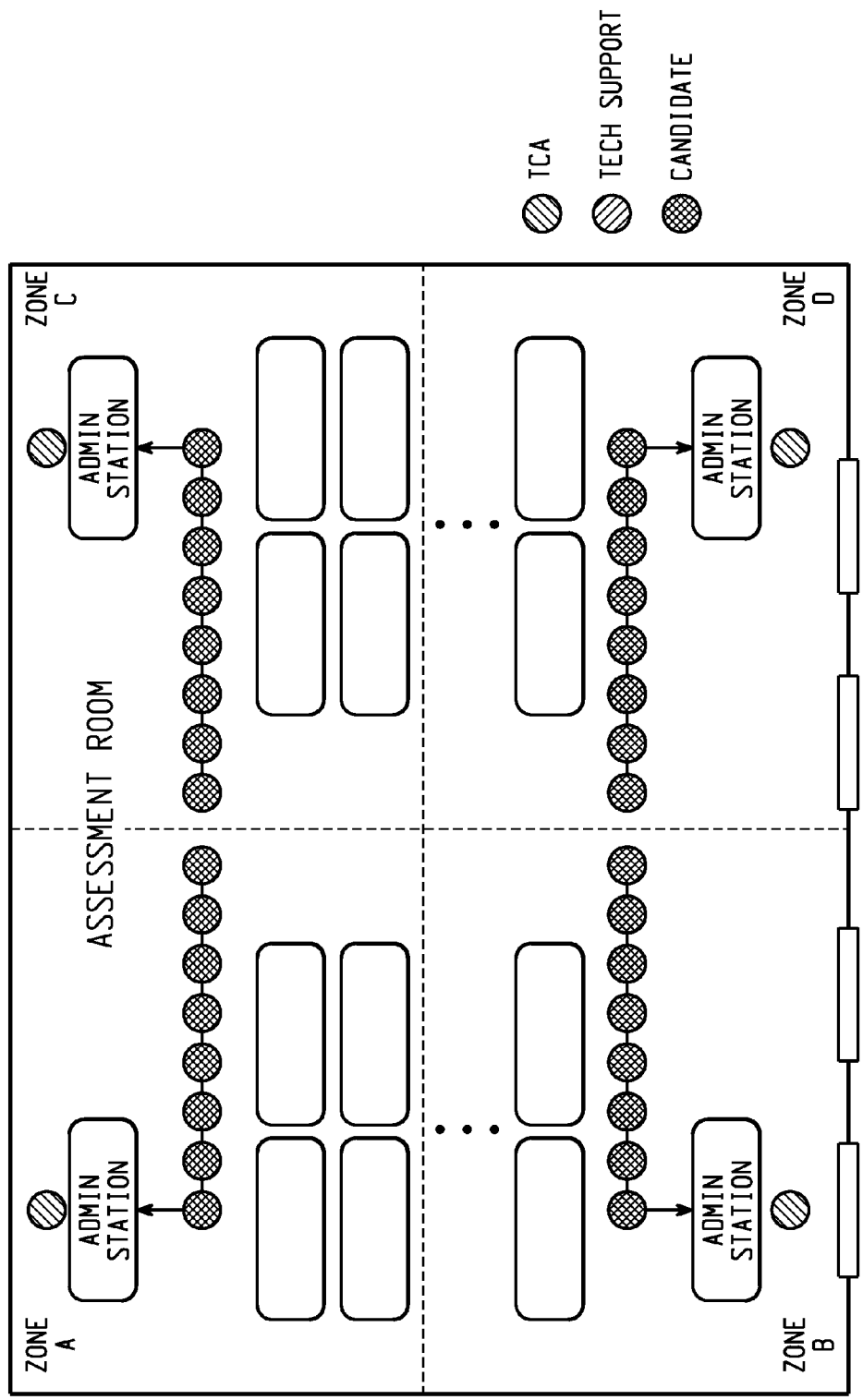
FIG. 13 is a diagram depicting exemplary check-in of test takers at assigned seating zones.

FIG. 13 is a diagram depicting test takers checking in at assigned seating zones. Once arriving at their assigned seating zone, a test taker proceeds to an administration station for final check in. There, the test taker is provided the external computer readable medium containing the secondary operating system to be used during the assessment administration.

Figure 14:
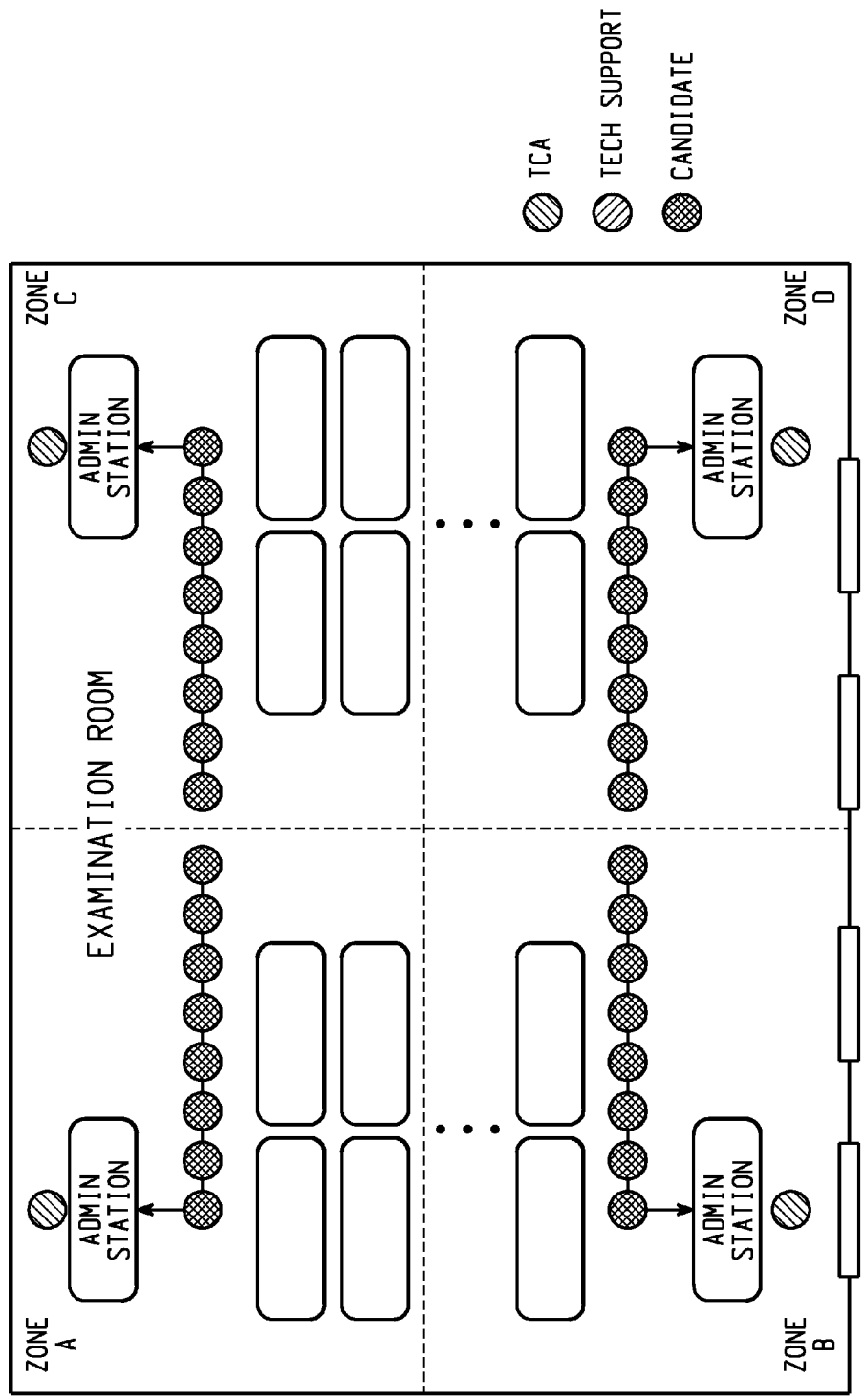
FIG. 14 is a diagram exemplary depicting return of external computer readable mediums after completion of an assessment administration.

FIG. 14 is a diagram depicting return of external computer readable mediums after completion of an assessment administration. After completion of the assessment, a test taker removes the external medium from their computer and returns the external medium to the administration station. Upon completion of external medium return and any required check out activities, the test taker is permitted to leave the examination room.

The distributed test administration engine (e.g., 102 of FIG. 1) may provide assessment materials for user response in a variety of ways. For example, a test may be administered in a static format, where test questions are provided in a predetermined order. A test may also be administered in a dynamic format, where subsequent test questions are provided based on answers received for prior test questions. A test administration engine may also provide a test according to a number of test administration rules, such as procedures that should be implemented in the case of a contingency such as a loss of power or loss of communication with the local server. Additional examples are provided in U.S. patent application Ser. No. 10/712,938, entitled "Systems and Method for Testing over a Distributed Network," the entirety of which is herein incorporated by reference.

Figure 15A:
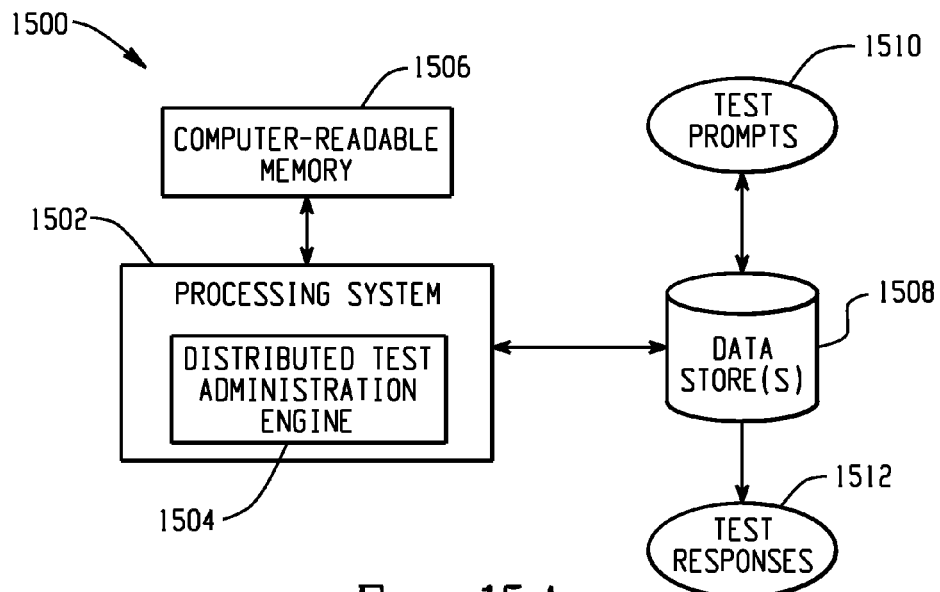
FIGS. 15A, 15B, and 15C depict exemplary systems for use in implementing a distributed test administration engine.
Figure 15B:
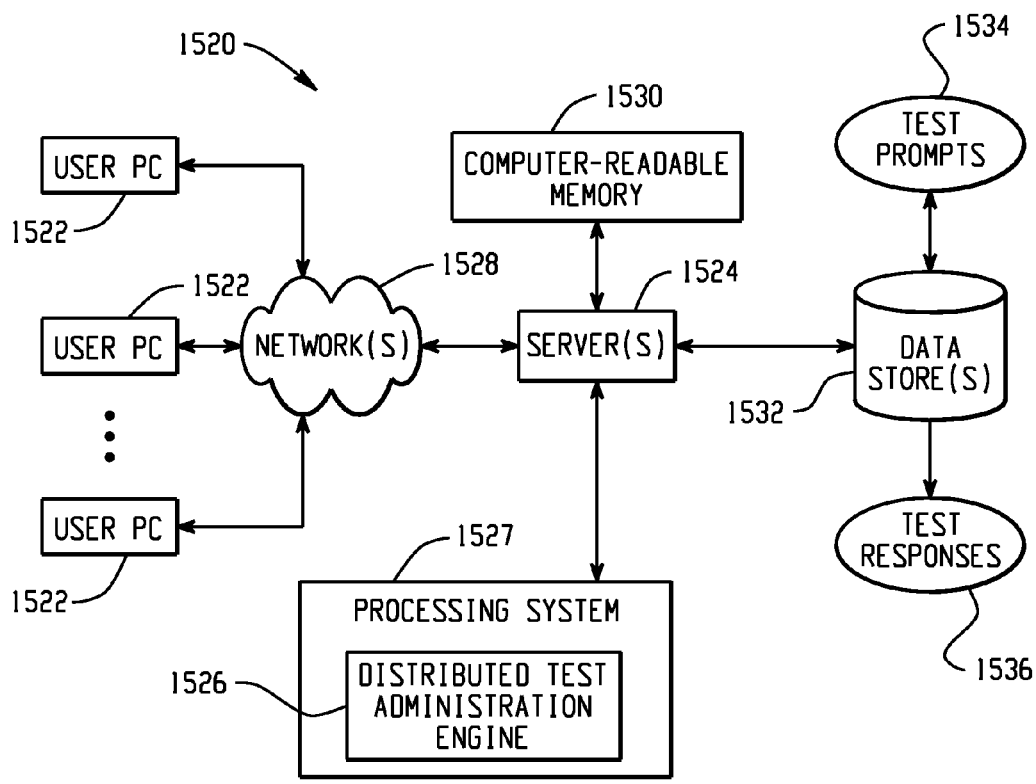
Figure 15C:
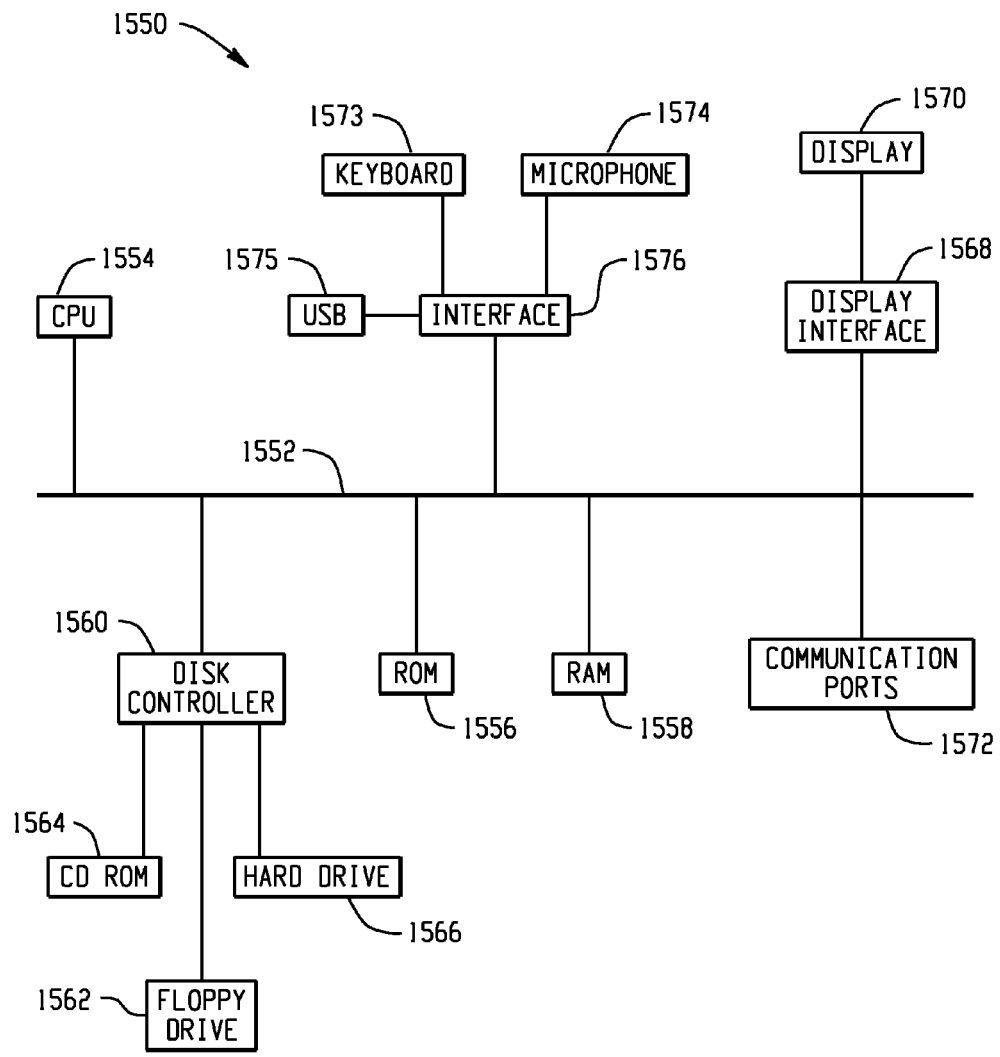

FIGS. 15A, 15B, and 15C depict example systems for use in implementing a distributed test administration engine. For example, FIG. 15A depicts an exemplary system 1500 that includes a standalone computer architecture where a processing system 1502 (e.g., one or more computer processors) includes a distributed test administration engine 1504 being executed on it. The processing system 1502 has access to a non-transitory computer readable memory 1506 in addition to one or more data stores 1508. The one or more data stores 1508 may include test prompts 1510 as well as test responses 1512.

FIG. 15B depicts a system 1520 that includes a client server architecture. One or more user PCs 1522 accesses one or more servers 1524 running a distributed test administration engine 1526 on a processing system 1527 via one or more networks 1528. The one or more servers 1524 may access a computer readable memory 1530 as well as one or more data stores 1532. The one or more data stores 1532 may contain test prompts 1534 as well as test responses 1536.

FIG. 15C shows a block diagram of exemplary hardware for a standalone computer architecture 1550, such as the architecture depicted in FIG. 15A that may be used to contain and/or implement the program instructions of system embodiments of the present invention. A bus 1552 may serve as the information highway interconnecting the other illustrated components of the hardware. A processing system 1554 labeled CPU (central processing unit) (e.g., one or more computer processors), may perform calculations and logic operations required to execute a program. A non-transitory computer-readable storage medium, such as read only memory (ROM) 1556 and random access memory (RAM) 1558, may be in communication with the processing system 1554 and may contain one or more programming instructions for performing the method of implementing a distributed test administration engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave and stored on a suitable memory. Programming instructions may be implemented using any suitable language such as, for example, C, C++, JAVA, etc., to cause a processing system to carry out the functionality described herein.

A disk controller 1560 interfaces one or more optional disk drives to the system bus 1552. These disk drives may be external or internal floppy disk drives such as 1562, external or internal CD-ROM, CD-R, CD-RW or DVD drives such as 1564, or external or internal hard drives 1566. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1560, the ROM 1556 and/or the RAM 1558. Preferably, the processor 1554 may access each component as required.

A display interface 1568 may permit information from the bus 1552 to be displayed on a display 1570 in audio, graphic, or alphanumeric format. Communication with external devices may optionally occur using various communication ports 1572.

In addition to the standard computer-type components, the hardware may also include data input devices, such as a keyboard 1573, or other input device, such as a microphone 1574, USB input 1575, remote control, pointer, mouse and/or joystick.

As additional examples, for example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of non-transitory processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present invention has been described in terms of exemplary embodiments, it will be understood by those or ordinary skill in the art that various modifications can be made thereto without departing from the scope of the invention set forth in the claims.

It is claimed:

1. A computer-implemented method of carrying out an examination with a client computer, comprising:
   booting a client computer using a secondary operating system other than a primary operating system of the client computer that is accessed from a computer readable medium provided by an administrator of an examination only on a day of the examination;
   sending a broadcast message from the client computer to check for the existence of a local server and to establish communication with the local server;
   receiving a client application from the local server for presenting the examination at the client computer;
   receiving assessment content for the examination from the local server;
   presenting the examination including the assessment content to a user of the client computer with the client application; and
   receiving user responses at the client computer and transmitting the user responses to the local server.

2. The method of claim 1, wherein the client computer and the local server communicate via a local network, and wherein the local server, the local network, and the client computer are not connected to the Internet during the examination.

3. The method of claim 1, wherein the assessment content and the user responses are not stored in non-volatile memory of the client computer.

4. The method of claim 1, wherein the assessment content and the client application are not available to the client computer prior to the day of the examination.

5. The method of claim 1, wherein the received assessment content is encrypted, and wherein the received assessment content is decrypted at the client computer prior to being presented to the user.

6. The method of claim 1, wherein the computer readable medium carrying the secondary operating system is a universal serial bus (USB) connectable memory.

7. The method of claim 6, further comprising storing the client application and the assessment content on the USB connectable memory.

8. The method of claim 1, further comprising storing the user responses in volatile memory of the client computer or on USB connectable memory prior to transmitting the user responses to the local server.

9. The method of claim 1, further comprising checking whether the audio, video, and memory capabilities of the client computer satisfy predetermined examination criteria.

10. The method of claim 1, further comprising transmitting the user responses to the local server during the examination while an assessment prompt is being displayed to the user.

11. The method of claim 1, further comprising executing a preliminary system requirements application at the client computer prior to a day on which the examination takes place, wherein the preliminary system requirements application is configured to determine whether the client computer satisfies one or more hardware requirements.

12. The method of claim 1, wherein the client computer is a laptop computer provided by the user.

13. The method of claim 1, wherein the computer readable medium carrying the secondary operating system is a CD or DVD.

14. The method of claim 1, wherein the secondary operating system prevents the primary operating system from booting.

15. A computer-implemented system for carrying out an examination, comprising:
   a processing system;
   a memory;
   wherein the processing system is configured to execute steps comprising:
      booting a client computer using a secondary operating system that is accessed from a computer readable medium that is external to the client computer;
      sending a broadcast message from the client computer to check for the existence of a local server and to establish a connection to the local server;
      receiving a client application from the local server;
      receiving assessment content from the local server;
      using the received client application to present the assessment content to the user; and
      receiving user responses and transmitting the user responses to the local server.

16. A non-transitory computer readable medium comprising instructions for carrying out an examination, the instructions, when executed, causing a processing system to carry out steps comprising:
   booting a client computer using a secondary operating system that is accessed from a computer readable medium that is external to the client computer;
   sending a broadcast message from the client computer to check for the existence of a local server and to establish a connection to the local server;
   receiving a client application from the local server;
   receiving assessment content from the local server;
   using the received client application to present the assessment content to the user; and
   receiving user responses and transmitting the user responses to the local server.

17. A computer-implemented method of administering an examination, comprising:
   receiving a broadcast message from a client computer at a local server and establishing communication with the client computer over a local network, wherein the local server, the local network, and the client computer are not connected to the Internet;
   transmitting a client application to the client computer;
   transmitting assessment content to the client computer for the examination; and
   receiving user responses from the client computer relating to the assessment content, the responses being transferred to the server computer via the local network without being stored in non-volatile storage on the client computer.

18. The method of claim 17, wherein the assessment content and the client application are not available to the client computer prior to the day of the examination.

19. The method of claim 17, wherein the transmitted assessment content is encrypted.

20. The method of claim 17, wherein the client computer is booted using a computer readable medium that carries a secondary operating system, wherein the computer readable medium is a universal serial bus (USB) connectable memory.

21. The method of claim 20, wherein the client application and the assessment content are stored on the USB connectable memory.

22. The method of claim 17, wherein the user responses are stored in volatile memory of the client computer or on USB connectable memory prior to the user responses being transferred to the local server.

23. The method of claim 17, wherein the user responses are transferred to the local server during the examination while an assessment prompt is being displayed.

24. The method of claim 17, wherein the client computer is a laptop computer provided by the user.

25. The method of claim 17, wherein a computer readable medium carrying a secondary operating system on a CD or DVD is provided to the user for booting the client computer.

26. The method of claim 17, wherein the secondary operating system prevents a primary operating system of the client computer from booting.

27. A computer-implemented system for administering out an examination, comprising:
- a processing system;
- a memory;
- wherein the processing system is configured to execute steps comprising:
  - receiving a broadcast message from a client computer at a local server and establishing communication with the client computer over a local network, wherein the local server, the local network, and the client computer are not connected to the Internet;
  - transmitting a client application to the client computer;
  - transmitting assessment content to the client computer for the examination; and
  - receiving user responses from the client computer relating to the assessment content, the responses being transferred to the server computer via the local network without being stored in non-volatile storage on the client computer.

28. A non-transitory computer readable medium comprising instructions for carrying out an examination, the instructions, when executed, causing a processing system to carry out steps comprising:
- receiving a broadcast message from a client computer at a local server and establishing communication with the client computer over a local network, wherein the local server, the local network, and the client computer are not connected to the Internet;
- transmitting a client application to the client computer;
- transmitting assessment content to the client computer for the examination; and
- receiving user responses from the client computer relating to the assessment content, the responses being transferred to the server computer via the local network without being stored in non-volatile storage on the client computer.

* * * * *